United States Patent
Takemoto

(10) Patent No.: US 10,401,601 B2
(45) Date of Patent: Sep. 3, 2019

(54) ZOOM LENS AND IMAGE PICKUP APPARATUS INCLUDING THE SAME

(71) Applicant: CANON KABUSHIKI KAISHA, Tokyo (JP)

(72) Inventor: Shoichi Takemoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 15/658,537

(22) Filed: Jul. 25, 2017

(65) Prior Publication Data
US 2018/0045929 A1 Feb. 15, 2018

(30) Foreign Application Priority Data
Aug. 9, 2016 (JP) ................. 2016-156314

(51) Int. Cl.
*G02B 15/173* (2006.01)
*G02B 27/64* (2006.01)
*G02B 15/20* (2006.01)

(52) U.S. Cl.
CPC .......... *G02B 15/173* (2013.01); *G02B 15/20* (2013.01); *G02B 27/646* (2013.01)

(58) Field of Classification Search
CPC ..... G02B 15/173; G02B 15/20; G02B 27/646
USPC ................................ 359/557, 766
See application file for complete search history.

(56) References Cited

U.S. PATENT DOCUMENTS

| 5,388,004 | A | * | 2/1995 | Adachi | G02B 15/173 359/683 |
|---|---|---|---|---|---|
| 9,645,369 | B2 | | 5/2017 | Takemoto | |
| 9,709,781 | B2 | | 7/2017 | Takemoto | |
| 2011/0205636 | A1 | * | 8/2011 | Ito | G02B 15/173 359/684 |
| 2011/0228159 | A1 | * | 9/2011 | Imaoka | G02B 15/173 348/345 |
| 2012/0092777 | A1 | * | 4/2012 | Tochigi | G02B 15/173 359/684 |
| 2015/0362711 | A1 | | 12/2015 | Wakazono et al. | |
| 2017/0108680 | A1 | | 4/2017 | Kikuchi et al. | |

(Continued)

FOREIGN PATENT DOCUMENTS

| JP | 2004-212611 A | 7/2004 |
|---|---|---|
| JP | 2007-219040 A | 8/2007 |

(Continued)

*Primary Examiner* — George G King
(74) *Attorney, Agent, or Firm* — Carter, DeLuca & Farrell LLP

(57) ABSTRACT

Provided is a zoom lens, including, in order from object side: a positive first unit; a negative second unit; a positive third unit; a negative fourth unit; and a positive fifth unit, in which: intervals between adjacent units are changed during zooming; the first unit is not moved in an optical axis direction for zooming, and the second, third, and fourth units are moved in the optical axis direction during zooming; the fourth unit is moved in the optical axis direction during focusing; the third unit includes, in order from the object side, a positive first subunit, and a positive second subunit, and the second subunit is moved during image stabilization in a direction having a component in a direction orthogonal to the optical axis; and focal lengths of the first, third, fourth unit, and the zoom lens at a wide angle end are appropriately set.

8 Claims, 9 Drawing Sheets

(56) References Cited

U.S. PATENT DOCUMENTS

2017/0269374 A1 9/2017 Takemoto et al.
2018/0045928 A1 2/2018 Takemoto

FOREIGN PATENT DOCUMENTS

| JP | 2012-073566 A | 4/2012 |
| JP | 2014-102526 A | 6/2014 |
| WO | 2013136692 A1 | 9/2013 |

* cited by examiner

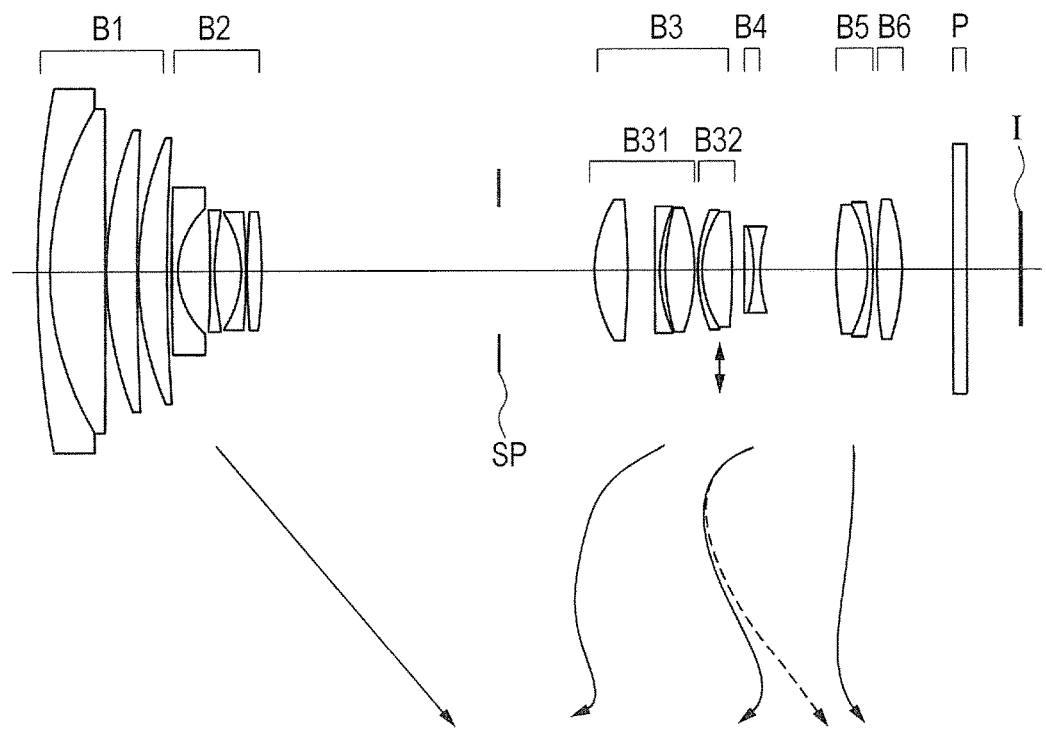
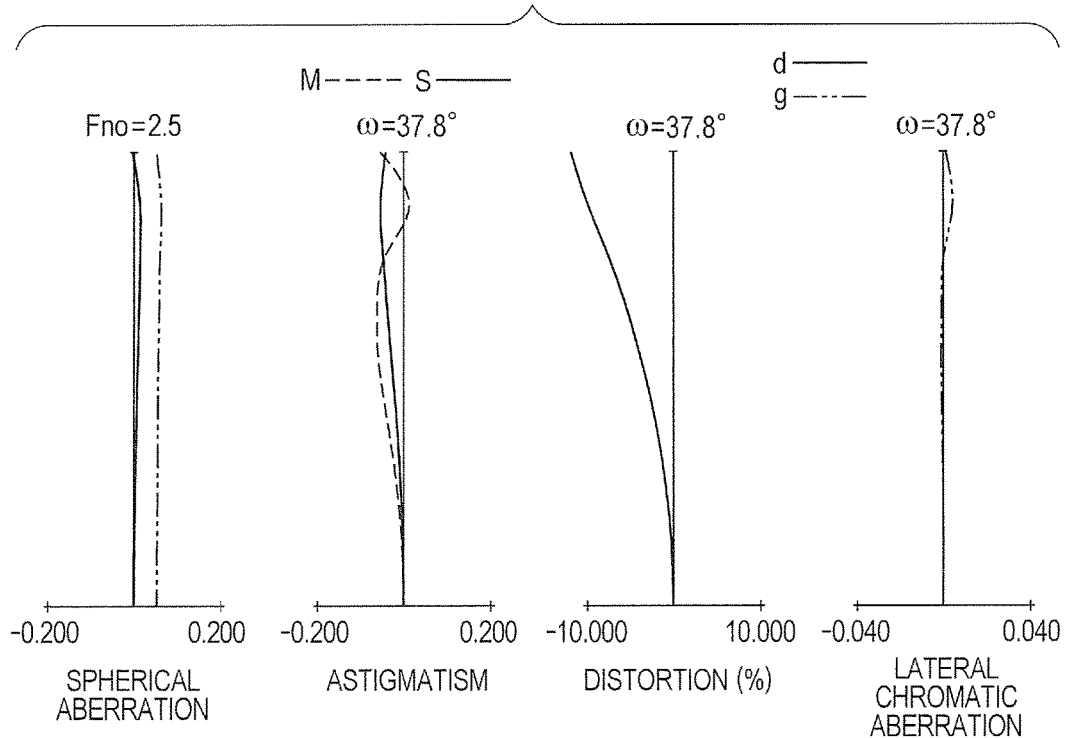

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and is suitable for a photographing system, for example, a digital camera, a video camera, or a television (TV) camera.

Description of the Related Art

In recent years, downsizing of the overall sizes of apparatus using solid-state image pickup elements, such as digital still cameras and video cameras, has been achieved. Meanwhile, large-size solid-state image pickup elements are demanded in order to obtain images having high image quality and a shallow depth of field, whereas further downsizing of zoom lenses is demanded.

As compact zoom lenses capable of efficiently ensuring a magnification varying ratio, there has hitherto been known a so-called rear focus-type zoom lens including, in order from an object side, lens units having positive, negative, positive, and negative refractive powers, in which the lens unit arranged on an image side of the third lens unit corrects the shift of an image plane accompanying zooming and performs focusing. Besides, in zoom lenses having a high zoom ratio and a zoom range with a long focal length, it is important to prevent images from being blurred due to vibration or camera shake, and such zoom lenses are thus desired to have an image stabilizing function for reducing blur of images.

For example, in Japanese Patent Application Laid-Open No. 2014-102526, there is disclosed a zoom lens including, in order from an object side, lens units having positive, negative, positive, negative, and positive refractive powers, in which the third lens unit is divided into three units and the middle unit corrects camera shake. In Japanese Patent Application Laid-Open No. 2004-212611, there is disclosed a zoom lens including, in order from an object side, lens units having positive, negative, positive, negative, and positive refractive powers, in which a cemented lens on the object side of the third lens unit is moved for image stabilization.

In Japanese Patent Application Laid-Open No. 2014-102526, the third lens unit is divided into the three units. In order to satisfactorily correct aberration during image stabilization, it is necessary that aberration be satisfactorily corrected in the lens subunits of the third lens unit, and hence the number of component lenses tends to be large. Consequently, when the third lens unit serves as a movable unit, a large actuator is required to drive the lens unit because the lens unit is heavy, and it is thus difficult to achieve downsizing and less power consumption.

In the configuration disclosed in Japanese Patent Application Laid-Open No. 2004-212611, the cemented lens on the object side of the third lens unit is moved for image stabilization. Light emitted from the negative second lens unit is divergent light, and hence it is difficult to reduce the lens diameter of the image stabilizing lens unit. Consequently, a large actuator is required to drive the image stabilizing lens unit, and it is thus difficult to achieve downsizing and less power consumption.

SUMMARY OF THE INVENTION

In view of the foregoing, it is an object of the present invention to provide a zoom lens that has satisfactory optical performance even during image stabilization and achieves downsizing of overall size of an optical system and downsizing of an image stabilizing lens unit, and to provide an image pickup apparatus including the zoom lens.

In order to achieve the above-mentioned object, according to one embodiment of the present invention, there is provided a zoom lens, including, in order from an object side to an image side: a first lens unit having a positive refractive power; a second lens unit having a negative refractive power; a third lens unit having a positive refractive power; a fourth lens unit having a negative refractive power; and a fifth lens unit having a positive refractive power, in which: intervals between adjacent lens units are changed during zooming; the first lens unit is not moved in an optical axis direction for zooming, and the second lens unit, the third lens unit, and the fourth lens unit are moved in the optical axis direction during zooming; the fourth lens unit is moved in the optical axis direction during focusing; the third lens unit includes, in order from the object side to the image side, a first lens subunit having a positive refractive power, and a second lens subunit having a positive refractive power, and the second lens subunit is moved during image stabilization in a direction having a component in a direction orthogonal to the optical axis; and the following conditional expressions are satisfied:

$$-1.35 < f3/f4 < -0.75; \text{ and}$$

$$5.70 < f1/fw < 7.50,$$

where f1 represents a focal length of the first lens unit, f3 represents a focal length of the third lens unit, f4 represents a focal length of the fourth lens unit, and fw represents a focal length of the zoom lens at a wide angle end.

According to the present invention, it is possible to provide the zoom lens that has satisfactory optical performance even during image stabilization and achieves the downsizing of overall size of the optical system and the downsizing of the image stabilizing lens unit, and the image pickup apparatus including the zoom lens.

Further features of the present invention will become apparent from the following description of exemplary embodiments with reference to the attached drawings.

BRIEF DESCRIPTION OF THE DRAWINGS

FIG. 5 is a lens cross-sectional view in the state in which focus is at infinity at a wide angle end according to Embodiment 3 (Numerical Embodiment 3) of the present invention.

FIG. 6A is aberration diagrams in the state in which focus is at infinity at the wide angle end according to Numerical Embodiment 3.

DESCRIPTION OF THE EMBODIMENTS

Figure 1:
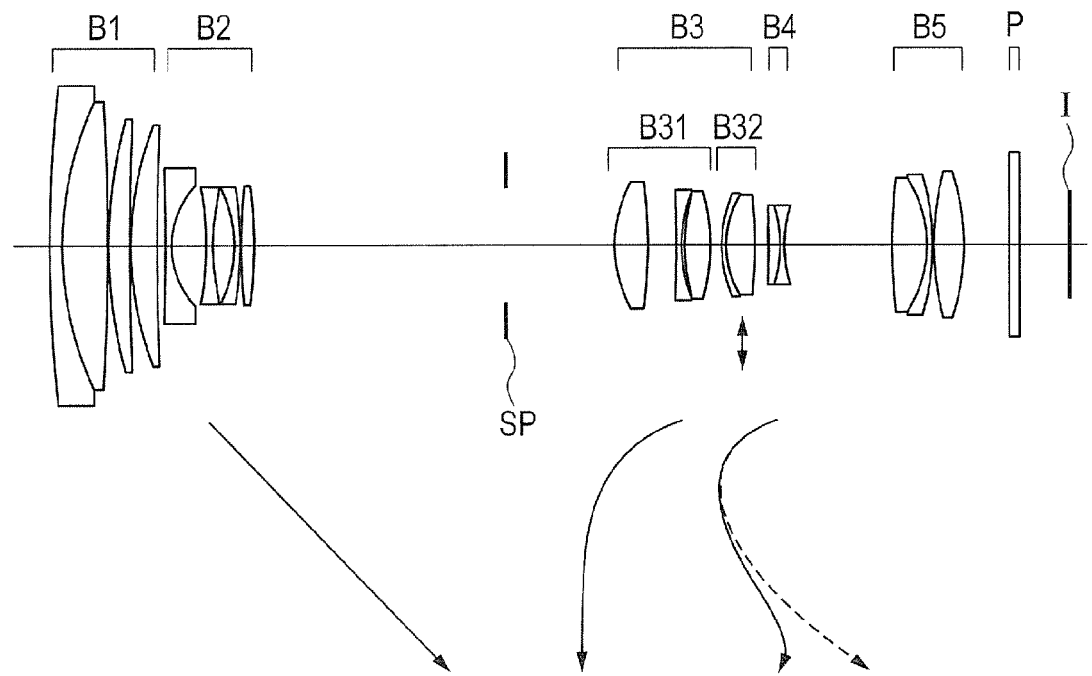
FIG. 1 is a lens cross-sectional view in a state in which focus is at infinity at a wide angle end according to Embodiment 1 (Numerical Embodiment 1) of the present invention.

Preferred embodiments of the present invention will now be described in detail in accordance with the accompanying drawings.

In order to obtain effects of the invention, a zoom lens according to the present invention includes, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power. With this configuration, downsizing and an increase in magnification varying ratio are both achieved.

During varying magnification (zooming), the first lens unit is fixed in an optical axis direction, and at least the second, third, and fourth lens units move in the optical axis direction. During focusing, the fourth lens unit moves in the optical axis direction. The first lens unit does not move for varying magnification, and hence the total lens length is unchanged during varying magnification and focusing. Further, the fourth lens unit having a negative refractive power serves as a focus lens unit, and the fifth lens unit having a positive refractive power is arranged on the image side of the fourth lens unit, which enable control of an extension amount during focusing. Specifically, the amount of change in image forming position due to the movement of the fourth lens unit in the optical axis direction can be increased. An increase in size of solid-state image pickup elements leads to increases in focal length of lenses and in extension amount during focusing. Thus, it is important to increase the amount of change in image forming position due to the movement of the fourth lens unit in the optical axis direction in order to reduce the lens in size. Further, the third lens unit includes a first lens subunit having a positive refractive power, and a second lens subunit having a positive refractive power. The lens subunit serves as an image stabilizing lens unit, and hence the number of component lenses of the lens can be reduced. Further, light emitted from the second lens unit, which is divergent light, is converged by the positive first lens subunit so that the ray height of an incident ray can be reduced, and the lens diameter of the second lens subunit can thus be reduced. As described above, the number of component lenses and the lens diameter of the second lens subunit are reduced, which enable downweighting of the second lens subunit, and also downsizing of an actuator configured to drive the image stabilizing lens unit. Downweighting and less power consumption can therefore be achieved.

In addition, the zoom lens according to the present invention satisfies the following conditional expressions:

$$-1.35 < f3/f4 < -0.75 \quad (1); \text{ and}$$

$$5.70 < f1/fw < 7.50 \quad (2),$$

where f3 represents the focal length of the third lens unit, f4 represents the focal length of the fourth lens unit, f1 represents the focal length of the first lens unit, and fw represents the focal length of the zoom lens at a wide angle end.

The conditional expression (1) is an expression defining the ratio of the focal length of the third lens unit to the focal length of the fourth lens unit. When the conditional expression (1) is satisfied, suppression of a variation in performance during image stabilization and a reduction in drive amount of the lens for image stabilization can be both achieved. When the ratio exceeds the upper limit value of the conditional expression (1), the refractive power of the third lens unit is weak, and the refractive powers of the first lens subunit and the second lens subunit are weak. When the refractive power of the first lens subunit is weak, a sufficient converging action is not obtained, and it is consequently difficult to reduce the diameter of the second lens subunit. Alternatively, the refractive power of the second lens subunit is weak, and the amount of movement of the second lens subunit for image stabilization in a direction orthogonal to the optical axis (the movement amount having a component in the direction orthogonal to the optical axis) is large. As a result, a large actuator is required to drive the image stabilizing lens unit, and it is consequently difficult to reduce the lens in size. In contrast, when the ratio falls below the lower limit value of the conditional expression (1), the refractive power of the third lens unit is strong and the refractive power of the first lens subunit is strong, with the result that it is difficult to correct the variation of spherical aberration during zooming. Alternatively, the refractive power of the second lens subunit is strong, and it is consequently difficult to suppress a variation in coma during image stabilization.

The conditional expression (2) is an expression defining the ratio of the focal length of the first lens unit to the focal length of the zoom lens at the wide angle end. When the ratio exceeds the upper limit value of the conditional expression (2), the refractive power of the first lens unit is weak, and the amount of movement of the second lens unit that is necessary for obtaining a predetermined magnification varying ratio is large, with the result that it is difficult to achieve downsizing and downweighting. In contrast, when the ratio falls below the lower limit value of the conditional expression (2), the refractive power of the first lens unit is strong, and it is consequently difficult to correct longitudinal chromatic aberration and spherical aberration at a telephoto end.

It is more preferred to set the conditional expressions (1) and (2) as follows:

$$-1.30 < f3/f4 < -0.80 \quad (1a); \text{ and}$$

$$5.90 < f1/fw < 7.40 \quad (2a).$$

In another aspect of the zoom lens according to the present invention, it is desired to satisfy the following conditional expression:

$$1.20 < f32/f3 < 2.60 \quad (3),$$

where f32 represents the focal length of the second lens subunit.

The conditional expression (3) defines the ratio of the focal length of the second lens subunit to the focal length of the third lens unit. When the ratio exceeds the upper limit value of the conditional expression (3), the refractive power of the second lens subunit is relatively strong, and the amount of movement of an image during driving of the second lens subunit for image stabilization is too large, with the result that it is difficult to control driving for image stabilization. In contrast, when the ratio falls below the lower limit value of the conditional expression (3), the refractive power of the second lens subunit is relatively weak, and the amount of movement of the second lens subunit for image stabilization in the direction orthogonal to the optical axis is large. As a result, a large actuator is required to drive the image stabilizing lens unit, and it is consequently difficult to reduce the lens in size.

It is more preferred to set the conditional expression (3) as follows:

$$1.35 < f32/f3 < 2.45 \quad (3a).$$

In another aspect of the zoom lens according to the present invention, it is desired to satisfy the following conditional expression:

$$-0.50 < f4/f1 < -0.20 \quad (4).$$

The conditional expression (4) defines the ratio of the focal length of the fourth lens unit to the focal length of the first lens unit. When the ratio exceeds the upper limit value of the conditional expression (4), the refractive power of the fourth lens unit is relatively weak, and the amount of movement of the fourth lens unit during image plane correction or focus adjustment is increased, with the result that it is difficult to reduce the zoom lens in size and weight. In contrast, when the ratio falls below the lower limit value of the conditional expression (4), the refractive power of the fourth lens unit is relatively strong, and a focus position is changed too much when the fourth lens unit moves, resulting in difficulty in position control during image plane correction or focus adjustment.

It is more preferred to set the conditional expression (4) as follows:

$$-0.48 < f4/f1 < -0.22 \quad (4a).$$

In another aspect of the zoom lens according to the present invention, it is preferred that the second lens subunit include one positive lens and one negative lens. When the second lens subunit includes the one positive lens and the one negative lens, chromatic aberration can be satisfactorily corrected in the second lens subunit. The second lens subunit is the image stabilizing lens unit, and hence the fact that chromatic aberration is satisfactorily corrected in the second lens subunit means that a variation in chromatic aberration during image stabilization can be suppressed. Further, with the second lens subunit including the two lenses, correction of chromatic aberration and downsizing and downweighting are both achieved. When the second lens subunit includes one positive lens, it is difficult to correct chromatic aberration. Further, when the second lens subunit includes three or more lenses, the weight of the second lens subunit serving as the image stabilizing lens unit is increased, and a large actuator is required to drive the lens during image stabilization, with the result that it is difficult to achieve downsizing and downweighting.

In another aspect of the zoom lens according to the present invention, it is preferred that the fourth lens unit include one positive lens and one negative lens. When the fourth lens unit includes the one positive lens and the one negative lens, chromatic aberration can be satisfactorily corrected in the fourth lens unit. The fourth lens unit is the focus lens unit, and hence the fact that chromatic aberration is satisfactorily corrected in the fourth lens unit means that a variation in chromatic aberration accompanying focusing can be suppressed. When the fourth lens unit includes one negative lens, it is difficult to correct chromatic aberration. Further, when the fourth lens unit includes three or more lenses, the weight of the fourth lens unit serving as the focus lens unit is increased, and a large actuator is required to drive the focus lens unit, with the result that it is difficult to achieve downsizing and downweighting.

Figure 10:
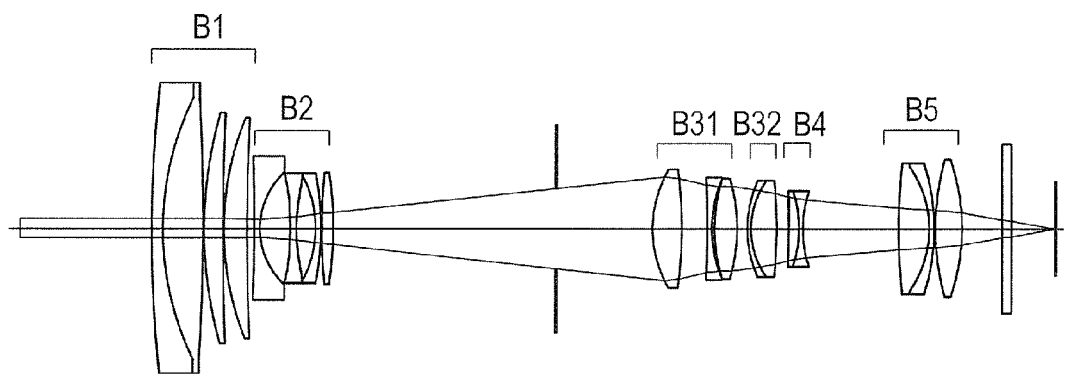
FIG. 10 is an optical path diagram of an axial ray in a state in which focus is at infinity at the wide angle end according to Numerical Embodiment 1.

In another aspect of the zoom lens according to the present invention, it is preferred that the third lens unit include at least five lens components. In order to suppress a variation in coma and a variation in curvature of field during image stabilization in the configuration in which a part of the third lens unit serves as the image stabilizing lens unit, it is necessary that aberration be satisfactorily corrected in the lens subunits of the third lens unit. In order to satisfactorily correct chromatic aberration, it is necessary that each of the first lens subunit and the second lens subunit include at least one negative lens. FIG. 10 is an optical path diagram for illustrating an axial ray and an off-axial ray at the wide angle end according to Embodiment 1 of the present invention. The first lens subunit is a lens unit at which an axial ray has the highest ray height, and is thus a lens unit in which spherical aberration and coma are generated by a large amount. When the first lens subunit only includes one positive lens and one negative lens, it is difficult to achieve correction of all of chromatic aberration, spherical aberration, and coma. It is accordingly preferred that the first lens subunit include at least two positive lenses and at least one negative lens, and the second lens subunit include at least one positive lens and at least one negative lens, that is, the third lens unit include five or more lenses in total.

In another aspect of the zoom lens according to the present invention, it is desired to satisfy the following conditional expression:

$$-6.40 < f1/f2 < -4.80 \quad (5),$$

where f2 represents the focal length of the second lens unit.

The conditional expression (5) defines the ratio of the focal length of the first lens unit to the focal length of the second lens unit. When the ratio exceeds the upper limit value of the conditional expression (5), the refractive power of the first lens unit is strong, and it is consequently difficult to correct longitudinal chromatic aberration and spherical aberration at the telephoto end. In contrast, when the ratio falls below the lower limit value of the conditional expression (5), the refractive power of the first lens unit is weak, and the amount of movement of the second lens unit that is necessary for obtaining a predetermined magnification varying ratio is large, with the result that it is difficult to achieve downsizing and downweighting.

It is more preferred to set the conditional expression (5) as follows:

$$-6.20 < f1/f2 < -5.00 \quad (5a).$$

In another aspect of the zoom lens according to the present invention, it is desired to satisfy the following conditional expression:

$$-5.00 < M2/M3 < -2.00 \quad (6),$$

where M2 represents the amount of movement of the second lens unit during varying magnification from the wide angle end to the telephoto end, and M3 represents the amount of movement of the third lens unit during varying magnification from the wide angle end to the telephoto end and a sign of an amount of movement of a lens unit is defined as positive when the lens unit is located closer to the image side at the telephoto end than at the wide angle end. Further, the sign of the amount of movement of each lens unit is negative when the lens unit is located closer to the object at the telephoto end than at the wide angle end, and is positive when the lens unit is located closer to the image at the telephoto end than at the wide angle end. Each of the differences in position M2 and M3 corresponds to the movement amount when the lens unit moves monotonously. When the lens units reciprocate, round trip distances are not included, and each of the differences in position M2 and M3 corresponds to a difference between a position at the wide angle end and a position at the telephoto end in the optical axis direction.

The conditional expression (6) defines the ratio of the amount of movement M2 of the second lens unit to the amount of movement M3 of the third lens unit during varying magnification from the wide angle end to the telephoto end. When the ratio exceeds the upper limit value of the conditional expression (6), the amount of movement M3 of the third lens unit is too large, and the total lens length is long. As a result, it is difficult to reduce the zoom lens in size, which is not preferred. When the ratio falls below the lower limit value of the conditional expression (6), the amount of movement M3 of the third lens unit is small, and the amount of movement of the second lens unit that is necessary for obtaining a predetermined zoom ratio is large. As a result, the total lens length tends to be increased and the first lens unit tends to be increased in size, which are not preferred.

It is more preferred to set the conditional expression (6) as follows:

$$-4.60 < M2/M3 < -2.30 \quad (6a).$$

Now, a specific configuration of the zoom lens according to the present invention is described by way of features of lens configurations of Numerical Embodiments 1 to 4 corresponding to Embodiments 1 to 4, respectively.

Embodiment 1

Figure 2A:
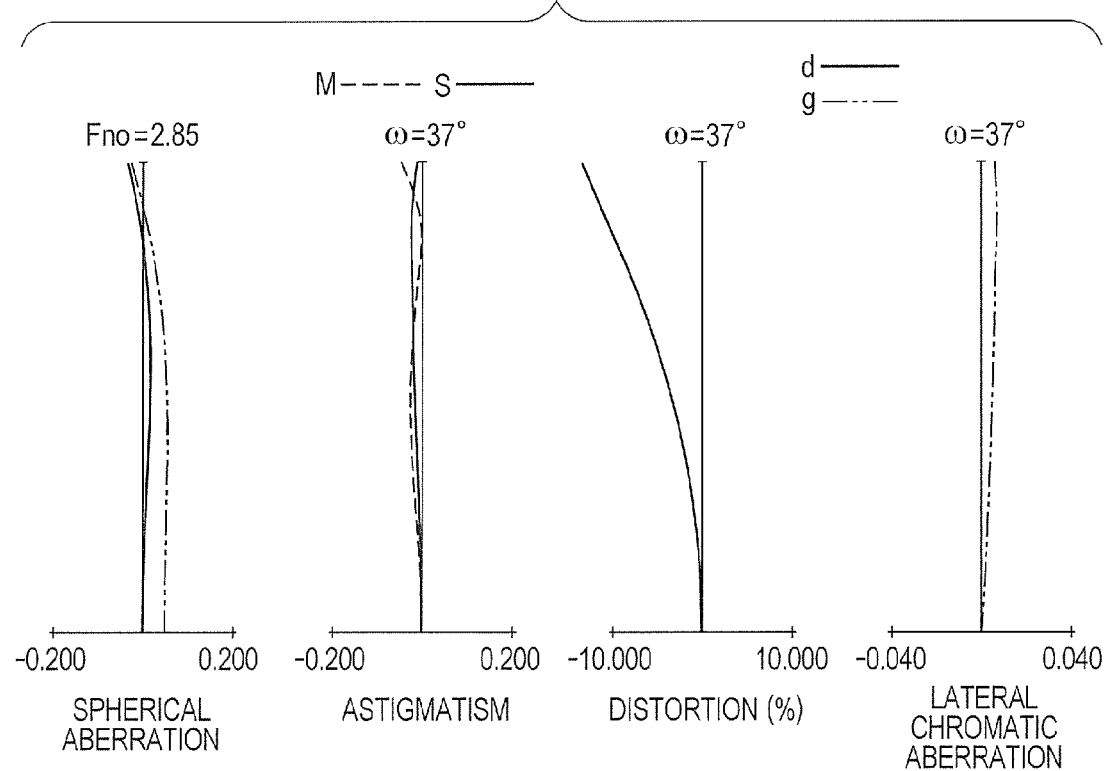
FIG. 2A is aberration diagrams in the state in which focus is at infinity at the wide angle end according to Numerical Embodiment 1.
Figure 2B:
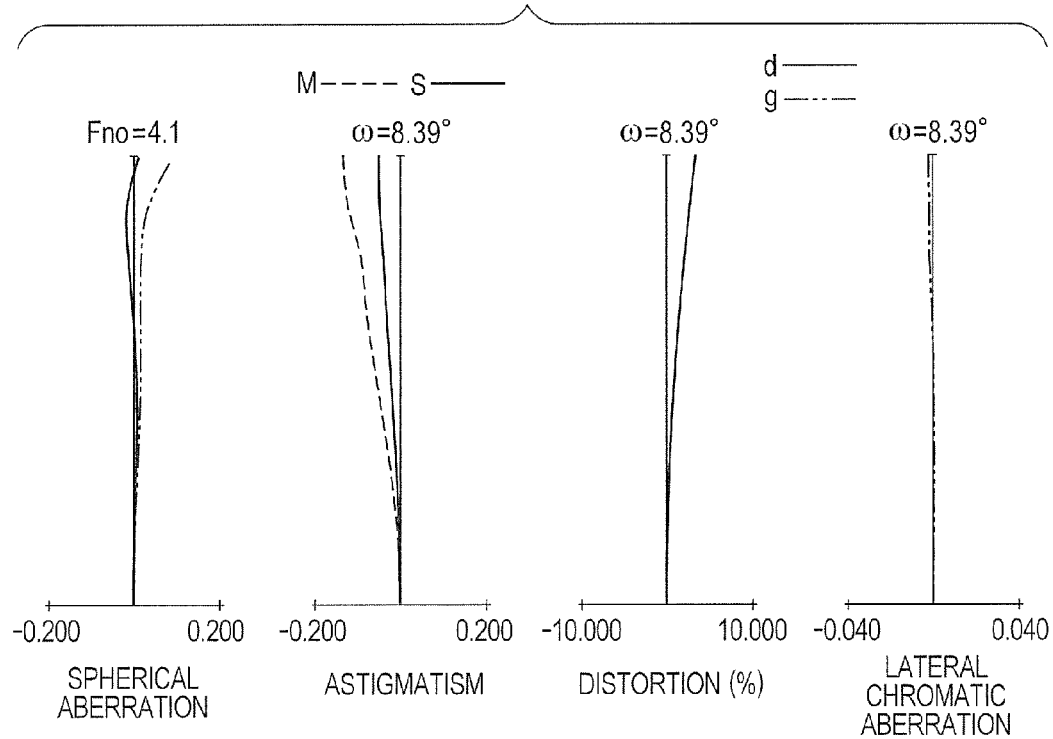
FIG. 2B is aberration diagrams in the state in which focus is at infinity at an intermediate zoom position according to Numerical Embodiment 1.
Figure 2C:
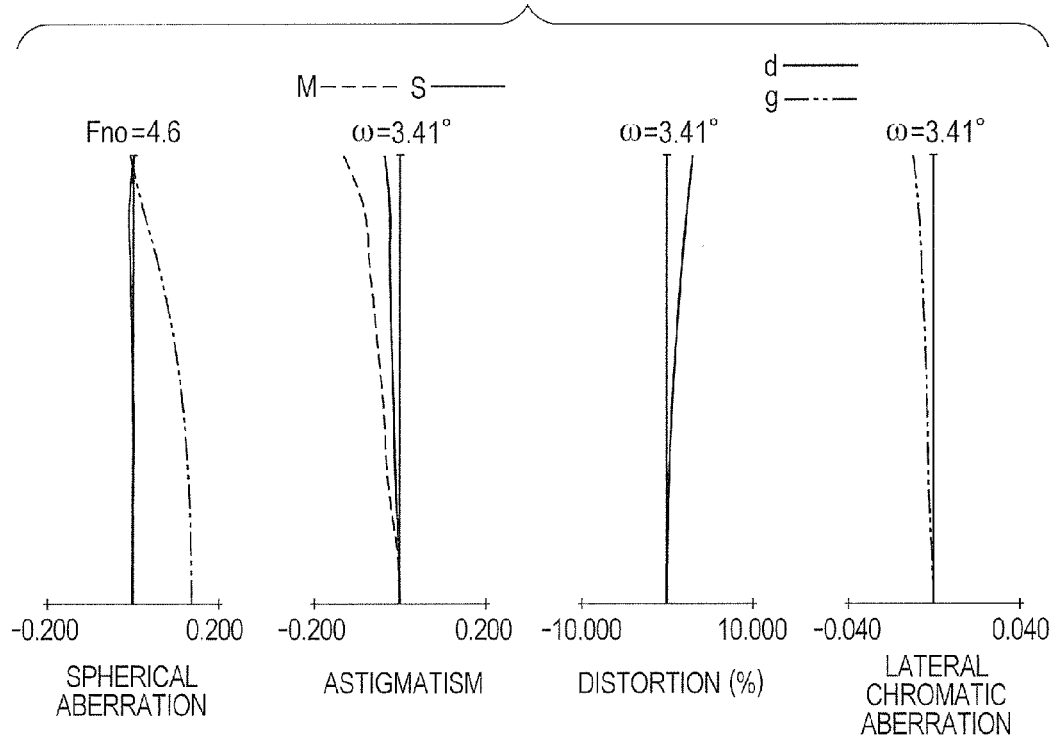
FIG. 2C is aberration diagrams in the state in which focus is at infinity at a telephoto end according to Numerical Embodiment 1.

FIG. 1 is a lens cross-sectional view when the focus is at the infinity at the wide angle end in the zoom lens according to Embodiment 1 (Numerical Embodiment 1) of the present invention. FIGS. 2A, 2B, and 2C are longitudinal aberration diagrams at the wide angle end, a focal length of 50.26 mm, and the telephoto end, respectively. Each of the aberration diagrams is the longitudinal aberration diagram when the focus is at the infinity. In addition, the value of the focal length is a value when a corresponding value in Numerical Embodiment 1 to be described later is represented in units of mm. This also applies to Numerical Embodiments described below.

In FIG. 1, the zoom lens includes, in order from the object side to the image side, a first lens unit B1, which has a positive refractive power. The zoom lens further includes a second lens unit B2 for varying magnification, which is configured to move toward the image side during varying magnification from the wide angle end to the telephoto end, and has a negative refractive power. The zoom lens further includes a third lens unit B3 for varying magnification, which is configured to move on the optical axis nonlinearly during varying magnification from the wide angle end to the telephoto end, and has a positive refractive power. The zoom lens further includes a negative fourth lens unit B4, which is configured to move on the optical axis nonlinearly in conjunction with the movement of the second lens unit and third lens unit, to thereby correct an image plane variation accompanying varying magnification. In addition, the fourth lens unit B4 moves toward the image side during focusing from an infinity side to a proximity side. The zoom lens further includes a fifth lens unit B5 having a positive refractive power that does not move for varying magnification, and has an image forming action. That is, during varying magnification, intervals between adjacent lens units of the first, second, third, fourth, and fifth lens units are changed. An aperture stop is denoted by SP. When the zoom lens is used as an image pickup optical system for a broadcasting television camera, a video camera, or a digital still camera, an image plane I corresponds to an image pickup surface of a solid-state image pickup element (photoelectric conversion element) or the like configured to receive light of an image formed by the zoom lens and to convert light to electricity. When the zoom lens is used as an image pickup optical system for a film camera, the image plane I corresponds to a film surface on which the image formed by the zoom lens is exposed.

In each of the longitudinal aberration diagrams, spherical aberration is illustrated with respect to a d-line and a g-line by a solid line and a two-dot chain line, respectively. Further, astigmatism is illustrated on a meridional image plane by a broken line and on a sagittal image plane by a solid line. In addition, lateral chromatic aberration is illustrated with respect to the g-line by a two-dot chain line. A half angle of view is denoted by ω and an F number is denoted by Fno. In each of the longitudinal aberration diagrams, spherical aberration is illustrated in the unit of 0.2 mm, astigmatism in the unit of 0.2 mm, distortion in the unit of 10%, and a lateral chromatic aberration in the unit of 0.04 mm. In each Embodiment described below, each of the wide angle end and the telephoto end refers to a zooming position obtained when the second lens unit B2 for varying magnification is positioned at each of the ends of a range in which the lens unit may mechanically move along the optical axis.

Next, the first lens unit B1 in Embodiment 1 is described. The first lens unit B1 corresponds to a first surface to a seventh surface. The first lens unit B1 includes a cemented lens obtained by cementing a meniscus concave lens having a convex surface on its object side and a biconvex lens, a meniscus convex lens having a convex surface on its object side, and a meniscus convex lens having a convex surface on its object side. The second lens unit B2 corresponds to an eighth surface to a fifteenth surface, and includes a biconcave lens, a biconcave lens, a meniscus concave lens having a convex surface on its image side, and a biconvex lens. Further, the tenth surface and the eleventh surface have aspherical shapes, and mainly correct variations in curvature of field and coma at a peripheral image height accompanying varying magnification. The third lens unit B3 corresponds to a seventeenth surface to a twenty-fifth surface, and includes a biconvex lens, a biconcave lens, a biconvex lens, and a cemented lens obtained by cementing a meniscus concave lens having a convex surface on its object side and a biconvex lens. Further, the seventeenth surface and the eighteenth surface have aspherical shapes, and mainly correct a variation in spherical aberration accompanying varying magnification. Further, the third lens unit B3 includes a first lens subunit B31 corresponding to the seventeenth surface to the twenty-second surface, and a second lens subunit B32 including a cemented positive lens corresponding to the twenty-third surface to the twenty-fifth surface. The second lens subunit B32 has a function of image stabilization to correct image blur due to, for example, shaking, which is exerted by the second lens subunit B32 moving in the direction having the component in the direction orthogonal to the optical axis. The fourth lens unit B4 corresponds to a twenty-sixth surface to a twenty-eighth surface, and includes a cemented lens obtained by cementing a meniscus convex lens having a convex surface on its image side and a biconcave lens. Further, the fourth lens unit B4 is a focus lens unit configured to move toward the image side during focusing from an infinity side (solid line in FIG. 1) to a proximity side (broken line in FIG. 1). The fifth lens unit B5 corresponds to a twenty-ninth surface to a thirty-third surface, and includes a cemented lens obtained by cementing a biconvex lens and a meniscus concave lens having a convex surface on its image side, and a biconvex lens.

Numerical Embodiment 1, which corresponds to Embodiment 1 described above, is described. In all Numerical Embodiments without limiting to Numerical Embodiment 1, the order of a surface (optical surface) from the object side is represented by i, a curvature radius of the i-th surface from the object side is represented by ri, and an interval between the i-th surface and the (i+1)-th surface from the object side (on the optical axis) is represented by di. Moreover, a refractive index and an Abbe number with respect to the d-line (587.6 nm) of a medium (optical member) between the i-th surface and the (i+1)-th surface are represented by ndi and νdi, respectively, and an air-equivalent back focus is represented by BF. The Abbe number νd is expressed by the following expression:

$$\nu d = (Nd-1)/(NF-NC),$$

where Nd represents a refractive index with respect to the d-line, NF represents a refractive index with respect to an F-line (486.1 nm), and NC represents a refractive index with respect to a C-line (656.3 nm). When an X axis is set in the optical axis direction, an H axis is set in a direction perpendicular to the optical axis, a direction of travel of light is defined as positive, a paraxial curvature radius is represented by R, a conic constant is represented by k, and aspherical coefficients are represented by A4, A6, A8, A10, and A12, the aspherical shape is expressed by the expression below. Moreover, "e-Z" means "$\times 10^{-Z}$". The half angle of view is a value obtained by ray tracing.

$$X = \frac{H^2/R}{1+\sqrt{1-(1+k)(H/R)^2}} + A4H^4 + A6H^6 + A8H^8 + A10H^{10} + A12H^{12}$$

The values of Embodiment 1 corresponding to the respective conditional expressions are shown in Table 1. Embodiment 1 satisfies the expressions (1) to (6), and realizes the zoom lens that has satisfactory optical performance even during image stabilization and achieves downsizing of overall size of the optical system and downsizing of the image stabilizing lens unit. It is essential that the zoom lens according to the present invention satisfy the expressions (1) and (2), but the zoom lens does not always need to satisfy the expressions (3) to (6). However, when at least one of the expressions (3) to (6) is satisfied, even better effects may be provided. This is also true for the other Embodiments.

Figure 9:
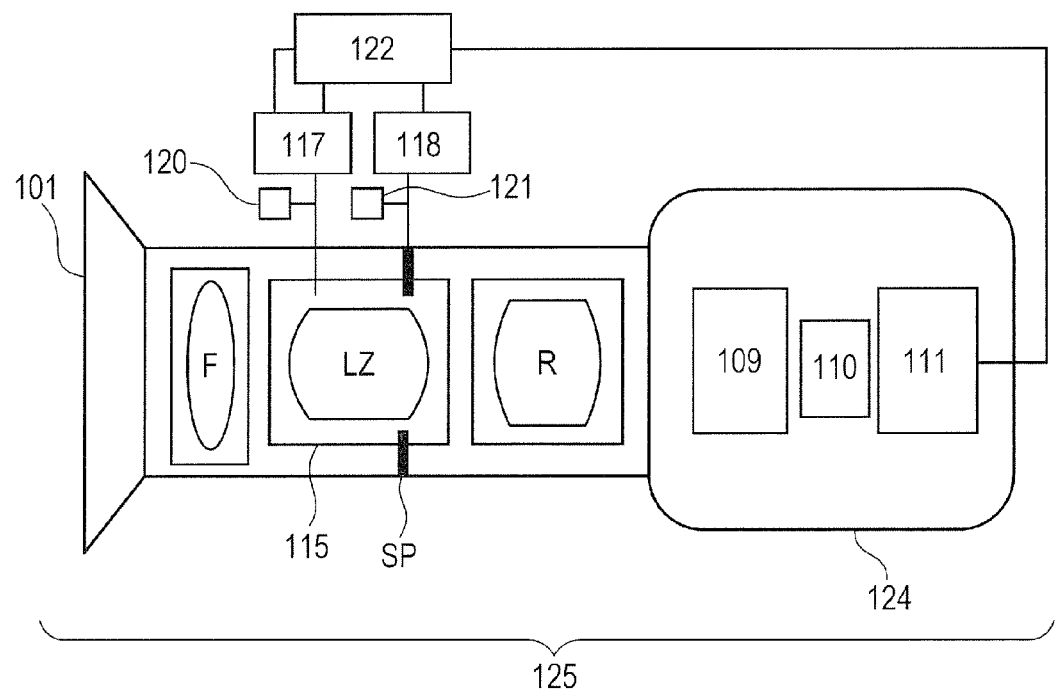
FIG. 9 is a diagram for illustrating an image pickup apparatus according to an embodiment of the present invention.

FIG. 9 is a schematic diagram of an image pickup apparatus (television camera system) using the zoom lens according to each of Embodiments as an image pickup optical system. In FIG. 9, the zoom lens according to any one of Embodiments 1 to 4, which is denoted by 101, and a camera 124 are illustrated. The zoom lens 101 is configured to be detachably attachable to the camera 124. An image pickup apparatus 125 is formed by attaching the zoom lens 101 to the camera 124. The zoom lens 101 includes a first lens unit F, a magnification varying portion LZ, and a lens unit R for image formation. The magnification varying portion LZ includes a lens unit for focusing. The magnification varying portion LZ includes the second lens unit and the third lens unit configured to move on the optical axis for varying magnification, and the fourth lens unit configured to move on the optical axis to correct an image plane variation accompanying varying magnification. The fourth lens unit also serves as the focus lens unit configured to move toward the image side during focusing from an infinity side to a proximity side. An aperture stop is denoted by SP. A drive mechanism 115, such as helicoids or cams, is configured to drive the magnification varying portion LZ in the optical axis direction. Motors (drive units) 117 and 118 are configured to electrically drive the drive mechanism 115 and the aperture stop SP, respectively. Detectors 120 and 121, such as encoders, potentiometers, or photosensors, are configured to detect the position of the magnification varying portion LZ on the optical axis, and an aperture diameter of the aperture stop SP, respectively. In the camera 124, a glass block 109 corresponds to an optical filter or a color separation optical system in the camera 124, and a solid-state image pickup element (photoelectric conversion element) 110, such as a charge-coupled device (CCD) sensor or a complementary metal oxide semiconductor (CMOS) sensor, is configured to receive light of an object image formed by the zoom lens 101. When an electronic image pickup element is used, the image quality of output images can be further increased through electronic correction of aberration. Moreover, central processing units (CPUs) 111 and 122 are configured to control various kinds of driving of the camera 124 and the zoom lens 101, respectively.

As described above, the zoom lens according to the present invention is applied to a digital video camera, a television camera, or a cinema camera to realize an image pickup apparatus having high optical performance.

Embodiment 2

Figure 3:
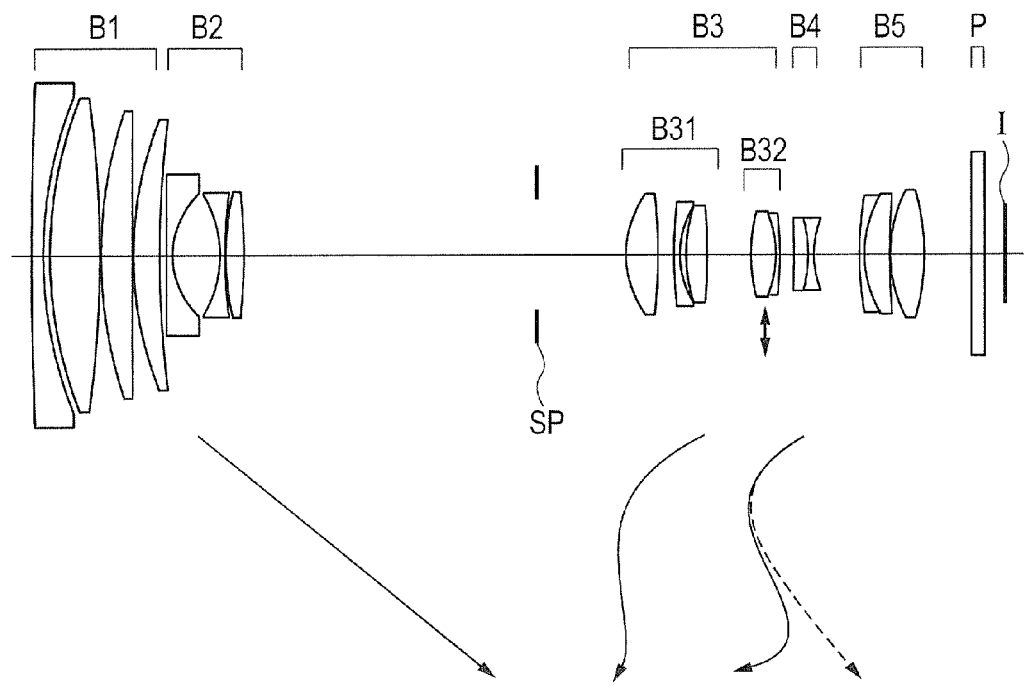
FIG. 3 is a lens cross-sectional view in the state in which focus is at infinity at a wide angle end according to Embodiment 2 (Numerical Embodiment 2) of the present invention.
Figure 4A:
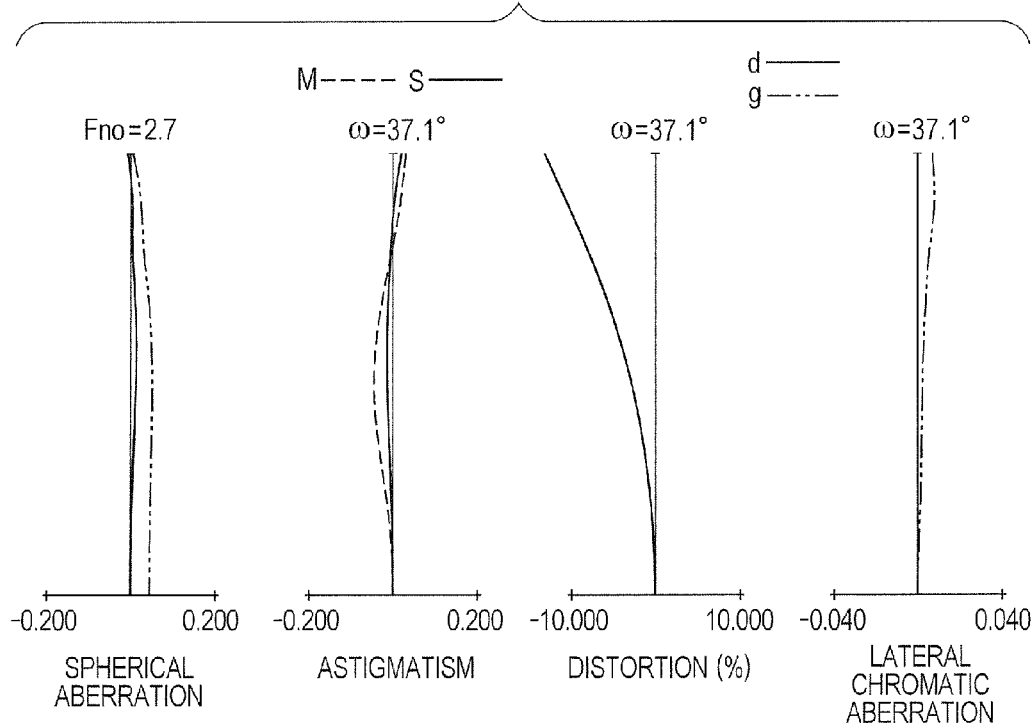
FIG. 4A is aberration diagrams in the state in which focus is at infinity at the wide angle end according to Numerical Embodiment 2.
Figure 4B:
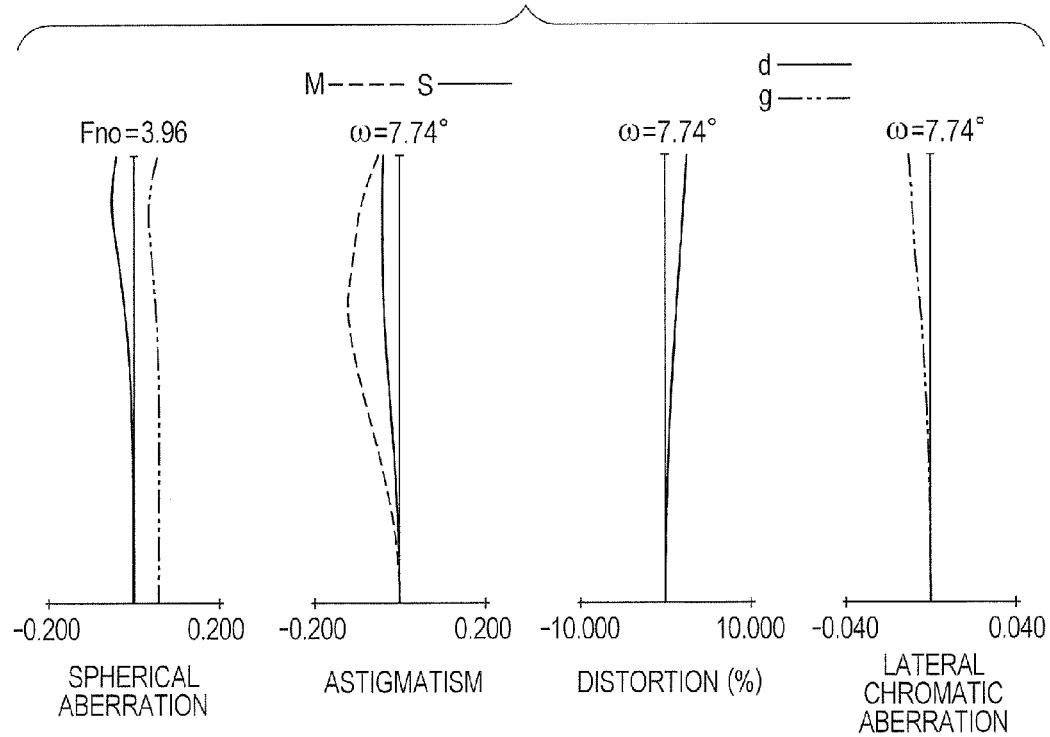
FIG. 4B is aberration diagrams in the state in which focus is at infinity at an intermediate zoom position according to Numerical Embodiment 2.
Figure 4C:
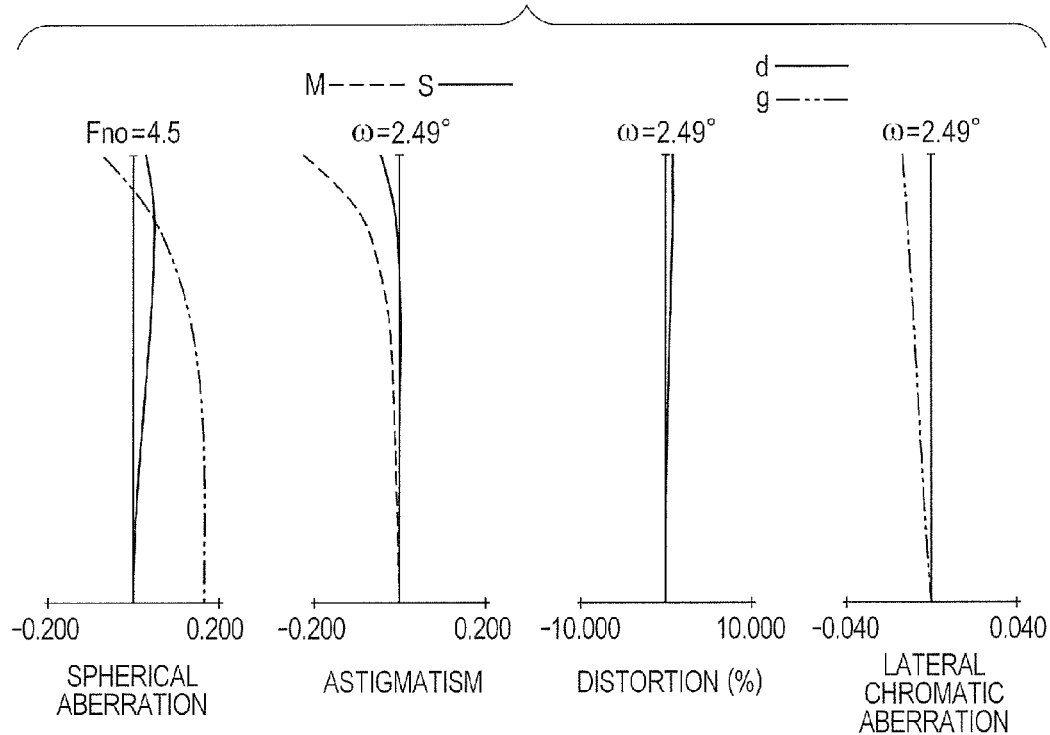
FIG. 4C is aberration diagrams in the state in which focus is at infinity at a telephoto end according to Numerical Embodiment 2.

FIG. 3 is a lens cross-sectional view when the focus is at the infinity at the wide angle end in the zoom lens according to Embodiment 2 (Numerical Embodiment 2) of the present invention. FIGS. 4A, 4B, and 4C are longitudinal aberration diagrams at the wide angle end, a focal length of 54.45 mm, and the telephoto end, respectively. Each of the aberration diagrams is the longitudinal aberration diagram when the focus is at the infinity. In FIG. 3, the zoom lens includes, in order from the object side, a first lens unit B1, which has a positive refractive power. The zoom lens further includes a second lens unit B2 for varying magnification, which is configured to move toward the image side during varying magnification from the wide angle end to the telephoto end, and has a negative refractive power. The zoom lens further includes a third lens unit B3 for varying magnification, which is configured to move on the optical axis nonlinearly during varying magnification from the wide angle end to the telephoto end, and has a positive refractive power. The zoom lens further includes a negative fourth lens unit B4, which is configured to move on the optical axis nonlinearly in conjunction with the movement of the second lens unit and third lens unit, to thereby correct an image plane variation accompanying varying magnification. In addition, the fourth lens unit moves toward the image side during focusing from an infinity side to a proximity side. The zoom lens further includes a fifth lens unit B5 having a positive refractive power, which is configured not to move for varying magnification, and has an image forming action. That is, during varying magnification, intervals between adjacent lens units of the first, second, third, fourth, and fifth lens units are changed. An aperture stop is denoted by SP, and an image plane is denoted by I.

Next, the first lens unit B1 of Embodiment 2 is described. The first lens unit B1 corresponds to a first surface to an eighth surface. The first lens unit B1 includes a meniscus concave lens having a convex surface on its object side, a biconvex lens, a meniscus convex lens having a convex surface on its object side, and a meniscus convex lens having a convex surface on its object side. The second lens unit B2 corresponds to a ninth surface to a fourteenth surface, and includes a meniscus concave lens having a convex surface on its object side, a biconcave lens, and a biconvex lens. Further, the tenth surface has an aspherical shape, and mainly corrects variations in curvature of field and coma at a peripheral image height accompanying varying magnification. The third lens unit B3 corresponds to a sixteenth surface to a twenty-fourth surface, and includes a biconvex lens, a meniscus concave lens having a convex surface on its object side, a biconvex lens, and a cemented lens obtained by cementing a biconvex lens and a meniscus concave lens having a convex surface on its image side. Further, the sixteenth surface and the seventeenth surface have aspherical shapes, and mainly correct a variation in spherical aberration accompanying varying magnification. Further, the third lens unit B3 includes a first lens subunit B31 corresponding to the sixteenth surface to the twenty-first surface, and a second lens subunit B32 including a cemented positive lens corresponding to the twenty-second surface to the twenty-fourth surface. The second lens subunit B32 has a function to correct vibration due to, for example, camera shake, which is exerted by the second lens subunit B32 moving in the direction having the component in the direction orthogonal to the optical axis. The fourth lens unit B4 corresponds to a twenty-fifth surface to a twenty-seventh surface, and includes a cemented lens obtained by cementing a meniscus convex lens having a convex surface on its image side and a biconcave lens. Further, the fourth lens unit B4 is a focus lens unit configured to move toward the image side during focusing from an infinity side (solid line in FIG. 3) to a proximity side (broken line in FIG. 3). The fifth lens unit B5 corresponds to a twenty-eighth surface to a thirty-second surface, and includes a cemented lens obtained by cementing a meniscus concave lens having a convex surface on its object side and a meniscus convex lens having a convex surface on its object side, and a biconvex lens. The values of Embodiment 2 corresponding to the respective conditional expressions are shown in Table 1. Embodiment 2 satisfies the expressions (1) to (6), and realizes the zoom lens that has satisfactory optical performance even during image stabilization and achieves downsizing of overall size of the optical system and downsizing of the image stabilizing lens unit.

Embodiment 3

Figure 6B:
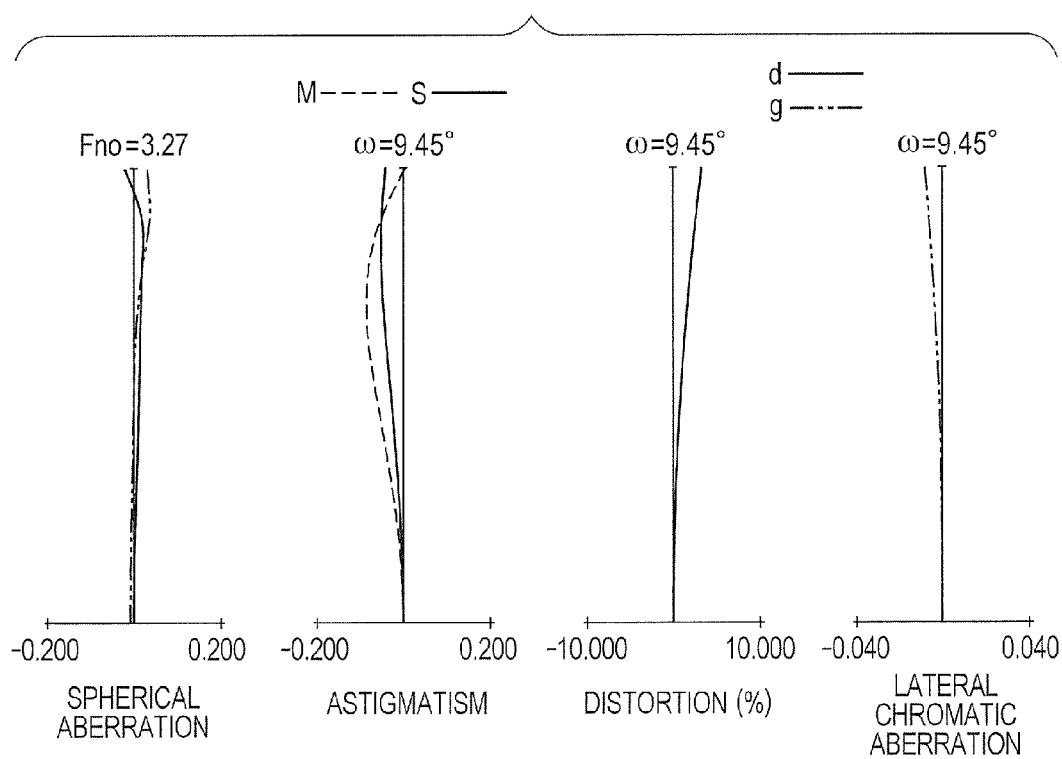
FIG. 6B is aberration diagrams in the state in which focus is at infinity at an intermediate zoom position according to Numerical Embodiment 3.
Figure 6C:
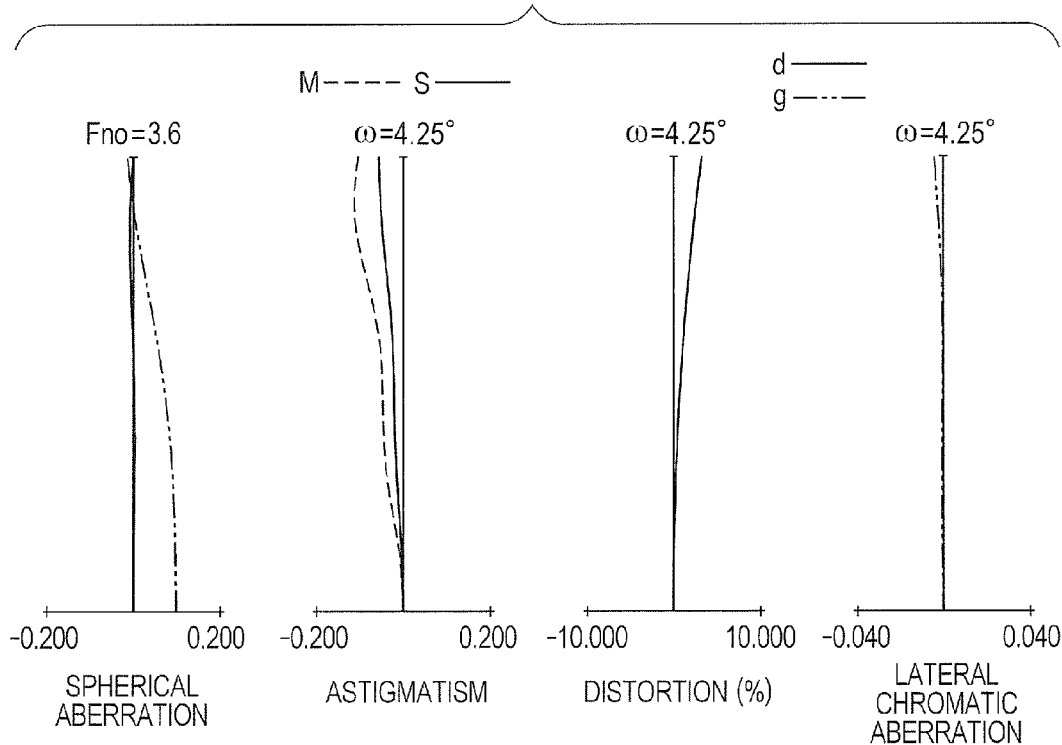
FIG. 6C is aberration diagrams in the state in which focus is at infinity at a telephoto end according to Numerical Embodiment 3.

FIG. 5 is a lens cross-sectional view when the focus is at the infinity at the wide angle end in the zoom lens according to Embodiment 3 (Numerical Embodiment 3) of the present invention. FIGS. 6A, 6B, and 6C are longitudinal aberration diagrams at the wide angle end, a focal length of 44.51 mm, and the telephoto end, respectively. Each of the aberration diagrams is the longitudinal aberration diagram when the focus is at the infinity. In FIG. 5, the zoom lens includes, in order from the object side, a first lens unit B1, which has a positive refractive power. The zoom lens further includes a second lens unit B2 for varying magnification, which is configured to move toward the image side during varying magnification from the wide angle end to the telephoto end, and has a negative refractive power. The zoom lens further includes a third lens unit B3 for varying magnification, which is configured to move on the optical axis nonlinearly during varying magnification from the wide angle end to the telephoto end, and has a positive refractive power. The zoom lens further includes a negative fourth lens unit B4, which is configured to move on the optical axis nonlinearly in conjunction with the movement of the second lens unit and third lens unit, to thereby correct an image plane variation accompanying varying magnification. The fourth lens unit B4 is configured to move toward the image side during focusing from an infinity side to a proximity side. The zoom lens further includes a fifth lens unit B5 for varying magnification, which is configured to move on the optical axis nonlinearly during varying magnification from the wide angle end to the telephoto end, and has a positive refractive power. The zoom lens further includes a sixth lens unit B6 having a positive refractive power, which is configured not to move for varying magnification, and has an image forming action. That is, during varying magnification, intervals between adjacent lens units of the first, second, third, fourth, fifth, and sixth lens units are changed. An aperture stop is denoted by SP, and an image plane is denoted by I.

Next, the first lens unit B1 according to Embodiment 3 is described. The first lens unit B1 corresponds to a first surface to a seventh surface. The first lens unit B1 includes a cemented lens obtained by cementing a meniscus concave lens having a convex surface on its object side and a biconvex lens, a meniscus convex lens having a convex surface on its object side, and a meniscus convex lens having a convex surface on its object side. The second lens unit B2 corresponds to an eighth surface to a fifteenth surface, and includes a meniscus concave lens having a convex surface on its object side, a biconcave lens, a meniscus concave lens having a convex surface on its image side, and a biconvex lens. Further, the tenth surface and the eleventh surface have aspherical shapes, and mainly correct variations in curvature of field and coma at a peripheral image height accompanying varying magnification. The third lens unit B3 corresponds to a seventeenth surface to a twenty-fifth surface, and includes a biconvex lens, a meniscus concave lens having a convex surface on its object side, a biconvex lens, and a cemented lens obtained by cementing a meniscus concave lens having a convex surface on its object side and a biconvex lens. Further, the seventeenth surface and the eighteenth surface have aspherical shapes, and mainly correct a variation in spherical aberration accompanying varying magnification. Further, the third lens unit B3 includes a first lens subunit B31 corresponding to the seventeenth surface to the twenty-second surface, and a second lens subunit B32 including a cemented positive lens corresponding to the twenty-third surface to the twenty-fifth surface. The second lens subunit B32 has a function to correct vibration due to, for example, camera shake, which is exerted by the second lens subunit B32 moving in the direction having the component in the direction orthogonal to the optical axis. The fourth lens unit B4 corresponds to a twenty-sixth surface to a twenty-eighth surface, and includes a cemented lens obtained by cementing a meniscus convex lens having a convex surface on its image side and a biconcave lens. Further, the fourth lens unit B4 is a focus lens unit configured to move toward the image side during focusing from an infinity side (solid line in FIG. 5) to a proximity side (broken line in FIG. 5). The fifth lens unit B5 corresponds to a twenty-ninth surface to a thirty-first surface, and includes a cemented lens obtained by cementing a biconvex lens and a meniscus concave lens having a convex surface on its image side. The sixth lens unit B6 corresponds to a thirty-second surface to a thirty-third surface, and includes a biconvex lens. The values of Embodiment 3 corresponding to the respective conditional expressions are shown in Table 1. Embodiment 3 satisfies the expressions (1) to (6), and realizes the zoom lens that has satisfactory optical performance even during image stabilization and achieves downsizing of overall size of the optical system and downsizing of the image stabilizing lens unit.

Embodiment 4

Figure 7:
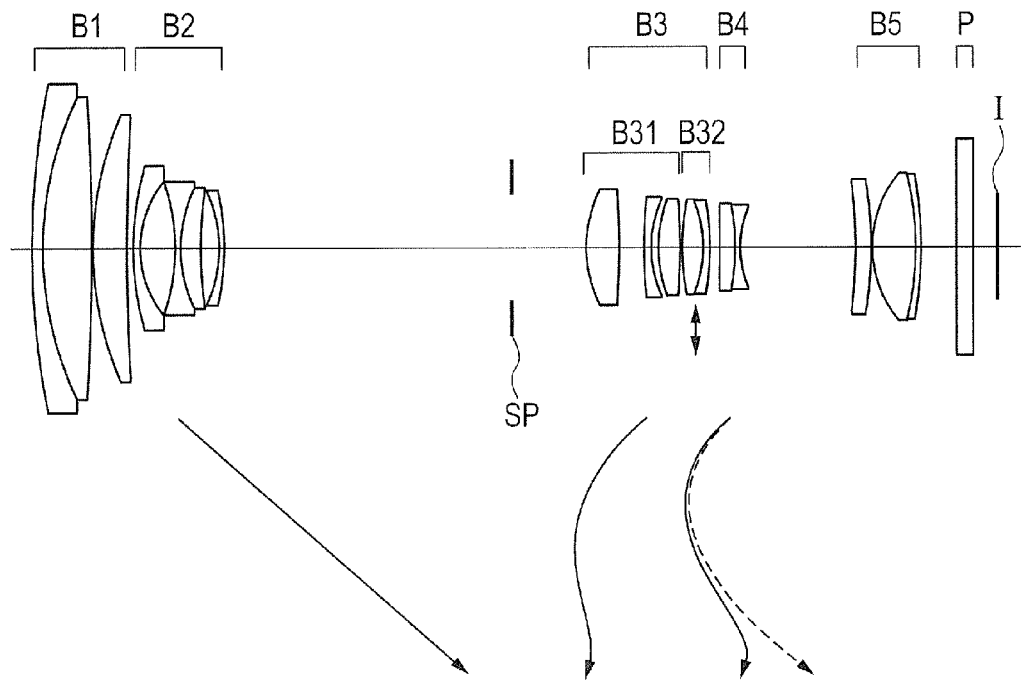
FIG. 7 is a lens cross-sectional view in the state in which focus is at infinity at a wide angle end according to Embodiment 4 (Numerical Embodiment 4) of the present invention.
Figure 8A:
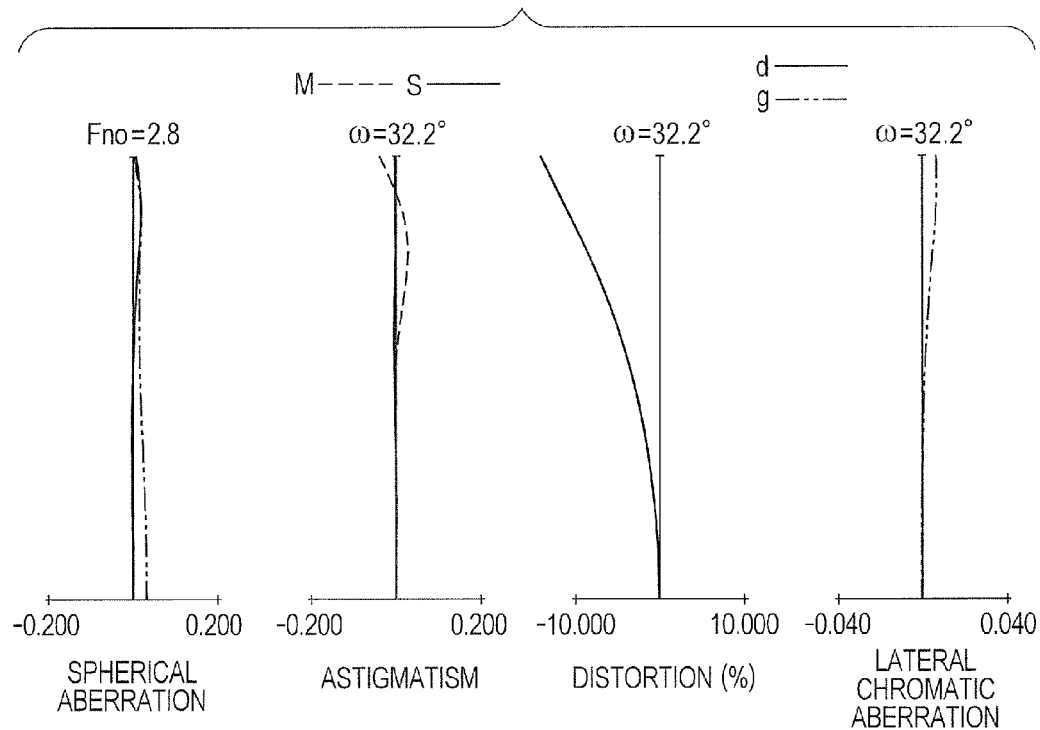
FIG. 8A is aberration diagrams in the state in which focus is at infinity at the wide angle end according to Numerical Embodiment 4.
Figure 8B:
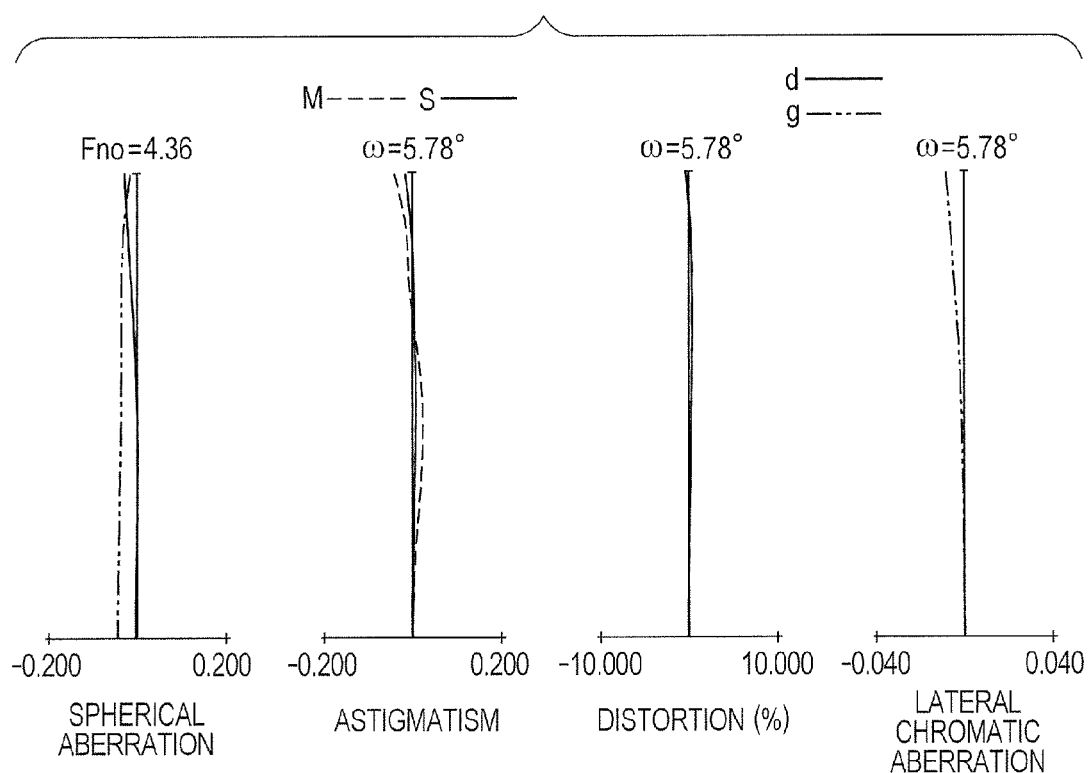
FIG. 8B is aberration diagrams in the state in which focus is at infinity at an intermediate zoom position according to Numerical Embodiment 4.
Figure 8C:
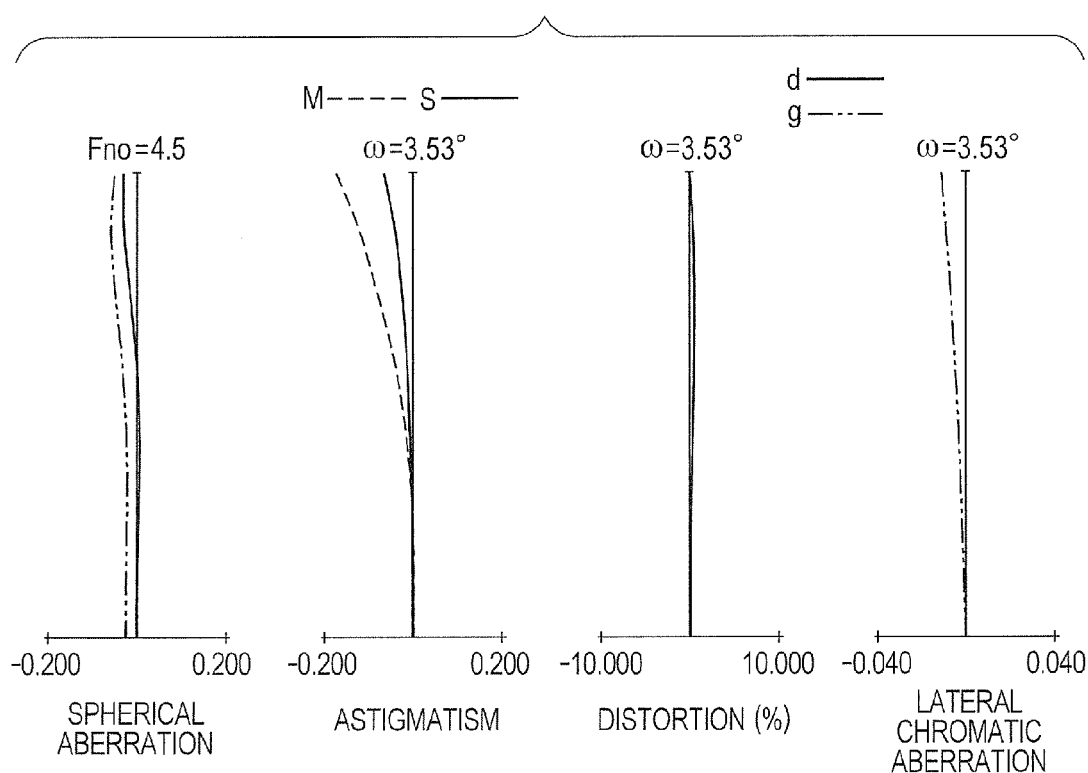
FIG. 8C is aberration diagrams in the state in which focus is at infinity at a telephoto end according to Numerical Embodiment 4.

FIG. 7 is a lens cross-sectional view when the focus is at the infinity at the wide angle end in the zoom lens according to Embodiment 4 (Numerical Embodiment 4) of the present invention. FIGS. 8A, 8B, and 8C are longitudinal aberration diagrams at the wide angle end, a focal length of 73.07 mm, and the telephoto end, respectively. Each of the aberration diagrams is the longitudinal aberration diagram when the focus is at the infinity. In FIG. 7, the zoom lens includes, in order from the object side, a first lens unit B1, which has a positive refractive power. The zoom lens further includes a second lens unit B2 for varying magnification, which is configured to move toward the image side during zooming from the wide angle end to the telephoto end, and has a negative refractive power. The zoom lens further includes a third lens unit B3 for varying magnification, which is configured to move on the optical axis nonlinearly during varying magnification from the wide angle end to the telephoto end, and has a positive refractive power. The zoom lens further includes a negative fourth lens unit B4, which is configured to move on the optical axis nonlinearly in conjunction with the movement of the second lens unit and third lens unit, to thereby correct an image plane variation accompanying varying magnification. In addition, the fourth lens unit moves toward the image side during focusing from an infinity side to a proximity side. The zoom lens further includes a fifth lens unit B5 having a positive refractive power, which is configured not to move for varying magnification, and has an image forming action. That is, during varying magnification, intervals between adjacent lens units of the first, second, third, fourth, and fifth lens units are changed. An aperture stop is denoted by SP, and an image plane is denoted by I.

Next, the first lens unit B1 according to Embodiment 4 is described. The first lens unit B1 corresponds to a first surface to a fifth surface. The first lens unit B1 includes a cemented lens obtained by cementing a meniscus concave lens having a convex surface on its object side and a biconvex lens, and a meniscus convex lens having a convex surface on its object side. The second lens unit B2 corresponds to a sixth surface to a twelfth surface, and includes a meniscus concave lens having a convex surface on its object side, a cemented lens obtained by cementing a biconcave lens and a meniscus convex lens having a convex surface on its object side, and a meniscus concave lens having a convex surface on its image side. Further, the seventh surface has an aspherical shape, and mainly corrects curvature of field on the wide angle side. The third lens unit B3 corresponds to a fourteenth surface to a twenty-second surface, and includes a biconvex lens, a meniscus concave lens having a convex surface on its object side, a biconvex lens, and a cemented lens obtained by cementing a biconvex lens and a meniscus concave lens having a convex surface on its image side. Further, the fourteenth surface and the eighteenth surface have aspherical shapes, and mainly correct a variation in spherical aberration accompanying varying magnification. Further, the third lens unit B3 includes a first lens subunit B31 corresponding to the fourteenth surface to the nineteenth surface, and a second lens subunit B32 including a cemented positive lens corresponding to the twentieth surface to the twenty-second surface. The second lens subunit B32 has a function to correct vibration due to, for example, camera shake, which is exerted by the second lens subunit B32 moving in the direction having the component in the direction orthogonal to the optical axis. The fourth lens unit B4 corresponds to a twenty-third surface to a twenty-fifth surface, and includes a cemented lens obtained by cementing a meniscus convex lens having a convex surface on its image side and a biconcave lens. Further, the twenty-third surface has an aspherical shape, and mainly corrects a variation in spherical aberration accompanying focusing. Further, the fourth lens unit B4 is a focus lens unit configured to move toward the image side during focusing from an infinity side (solid line in FIG. 7) to a proximity side (broken line in FIG. 7). The fifth lens unit B5 corresponds to a twenty-sixth surface to a thirtieth surface, and includes a meniscus concave lens having a convex surface on its image side, and a cemented lens obtained by cementing a biconvex lens and a meniscus concave lens having a convex surface on its image side. Further, the twenty-seventh surface has an aspherical shape, and mainly corrects curvature of field and coma at a peripheral image height. The values of Embodiment 4 corresponding to the respective conditional expressions are shown in Table 1. Embodiment 4 satisfies the expressions (1) to (6), and realizes the zoom lens that has satisfactory optical performance even during image stabilization and achieves downsizing of overall size of the optical system and downsizing of the image stabilizing lens unit.

Numerical Embodiment 1

| Unit mm | | | | |
| --- | --- | --- | --- | --- |
| Spherical data | | | | |
| Surface number i | ri | di | ndi | vdi |
| 1 | 203.590 | 1.73 | 1.91650 | 31.6 |
| 2 | 46.073 | 6.23 | 1.49700 | 81.5 |
| 3 | −338.931 | 0.15 | | |
| 4 | 65.676 | 2.89 | 1.49700 | 81.5 |
| 5 | 423.518 | 0.13 | | |
| 6 | 45.557 | 3.60 | 1.76385 | 48.5 |
| 7 | 352.111 | (Variable) | | |

-continued

| Unit mm | | | | |
|---|---|---|---|---|
| 8 | −345.383 | 0.86 | 1.83481 | 42.7 |
| 9 | 11.919 | 4.70 | | |
| 10* | −58.675 | 0.95 | 1.58313 | 59.5 |
| 11* | 26.335 | 2.97 | | |
| 12 | −17.543 | 0.80 | 1.49700 | 81.5 |
| 13 | −47.435 | 0.11 | | |
| 14 | 79.462 | 1.78 | 1.92286 | 18.9 |
| 15 | −64.072 | (Variable) | | |
| 16 (Stop) | ∞ | (Variable) | | |
| 17* | 17.378 | 4.55 | 1.58313 | 59.5 |
| 18* | −59.245 | 3.92 | | |
| 19 | −214.092 | 0.70 | 1.83400 | 37.2 |
| 20 | 19.622 | 0.45 | | |
| 21 | 26.986 | 3.49 | 1.43700 | 95.1 |
| 22 | −27.056 | 1.56 | | |
| 23 | 18.009 | 0.58 | 1.95375 | 32.3 |
| 24 | 12.939 | 3.98 | 1.48749 | 70.2 |
| 25 | −71.491 | (Variable) | | |
| 26 | −265.768 | 1.62 | 1.84666 | 23.9 |
| 27 | −18.099 | 0.58 | 1.78590 | 44.2 |
| 28 | 18.282 | (Variable) | | |
| 29 | 87.178 | 4.77 | 1.48749 | 70.2 |
| 30 | −16.724 | 0.77 | 2.00069 | 25.5 |
| 31 | −33.542 | 0.17 | | |
| 32 | 39.050 | 4.13 | 1.48749 | 70.2 |
| 33 | −31.888 | (Variable) | | |
| 34 | ∞ | 1.44 | 1.51633 | 64.1 |
| 35 | ∞ | 6.87 | | |
| Image plane | ∞ | | | |

Aspherical data

Tenth surface

K = 0.00000e+000   A4 = −3.18873e−005   A6 = −3.42311e−007
A8 = 1.67887e−009

Eleventh surface

K = 0.00000e+000   A4 = −6.53597e−005   A6 = −2.82787e−007
A8 = 1.83322e−009

Seventeenth surface

K = 0.00000e+000   A4 = −1.69513e−005   A6 = −1.67145e−008
A8 = −1.47643e−010

Eighteenth surface

K = 0.00000e+000   A4 = 2.01188e−005   A6 = −3.66026e−008
A8 = 3.38763e−011

Various data
Zoom ratio 14.55

| | Wide angle | Intermediate | Telephoto |
|---|---|---|---|
| Focal length | 8.55 | 50.26 | 124.40 |
| F number | 2.85 | 4.10 | 4.60 |
| Half angle of view | 37.02 | 8.39 | 3.41 |
| Image height | 6.45 | 7.41 | 7.41 |
| Total lens length | 139.31 | 139.31 | 139.31 |
| BF | 14.02 | 14.02 | 14.02 |
| d7 | 1.12 | 24.36 | 34.32 |
| d15 | 34.47 | 11.23 | 1.27 |
| d16 | 14.88 | 0.98 | 0.96 |
| d25 | 1.85 | 13.96 | 15.98 |
| d28 | 14.82 | 16.60 | 14.60 |
| d33 | 6.19 | 6.19 | 6.19 |

Zoom lens unit data

| Unit | First surface | Focal length |
|---|---|---|
| 1 | 1 | 54.94 |
| 2 | 8 | −10.29 |
| 3 | 17 | 21.84 |
| 4 | 26 | −23.30 |
| 5 | 29 | 31.44 |

Numerical Embodiment 2

| Unit mm | | | | |
|---|---|---|---|---|
| Spherical data | | | | |
| Surface number i | ri | di | ndi | vdi |
| 1 | 628.518 | 1.71 | 1.90366 | 31.3 |
| 2 | 62.741 | 1.00 | | |
| 3 | 63.212 | 7.46 | 1.49700 | 81.5 |
| 4 | −170.632 | 0.15 | | |
| 5 | 67.586 | 4.64 | 1.53775 | 74.7 |
| 6 | 7465.192 | 0.15 | | |
| 7 | 53.915 | 3.91 | 1.76385 | 48.5 |
| 8 | 163.850 | (Variable) | | |
| 9 | 11891.795 | 0.89 | 1.85135 | 40.1 |
| 10* | 11.946 | 7.12 | | |
| 11 | −17.253 | 0.68 | 1.59522 | 67.7 |
| 12 | 64.849 | 0.14 | | |
| 13 | 42.108 | 2.71 | 1.92286 | 18.9 |
| 14 | −89.121 | (Variable) | | |
| 15 (Stop) | ∞ | (Variable) | | |
| 16* | 14.380 | 4.80 | 1.58313 | 59.4 |
| 17* | −71.741 | 2.38 | | |
| 18 | 69.289 | 0.89 | 1.83400 | 37.2 |
| 19 | 13.817 | 0.91 | | |
| 20 | 23.568 | 3.16 | 1.49700 | 81.5 |
| 21 | −95.858 | 6.51 | | |
| 22 | 25.709 | 3.72 | 1.59522 | 67.7 |
| 23 | −16.166 | 0.60 | 1.69895 | 30.1 |
| 24 | −51.871 | (Variable) | | |
| 25 | −147.095 | 2.11 | 1.95906 | 17.5 |
| 26 | −20.213 | 0.85 | 1.83400 | 37.2 |
| 27 | 14.670 | (Variable) | | |
| 28 | 50.676 | 0.76 | 1.80809 | 22.8 |
| 29 | 17.046 | 3.77 | 1.60342 | 38.0 |
| 30 | 111.069 | 0.10 | | |
| 31 | 20.508 | 5.08 | 1.49700 | 81.5 |
| 32 | −34.358 | (Variable) | | |
| 33 | ∞ | 2.00 | 1.51633 | 64.1 |
| 34 | ∞ | 3.05 | | |
| Image plane | ∞ | | | |

Aspherical data

Tenth surface

K = −5.27323e−001   A4 = 1.30485e−005   A6 = 5.15930e−008
A8 = 2.88029e−009   A10 = −2.93057e−011   A12 = 2.02915e−013

Sixteenth surface

K = −8.18409e−002   A4 = −2.12687e−005   A6 = −8.02485e−008
A8 = 3.27136e−010   A10 = −5.43347e−012   A12 = −2.05658e−014

Seventeenth surface

K = −2.56428e+001   A4 = 9.78783e−006   A6 = −5.78943e−008
A8 = 8.16150e−010   A10 = −8.99064e−012   A12 = 6.39737e−015

Various data
Zoom ratio 20.00

| | Wide angle | Intermediate | Telephoto |
|---|---|---|---|
| Focal length | 8.50 | 54.45 | 170.00 |
| F number | 2.70 | 3.96 | 4.50 |
| Half angle of view | 37.14 | 7.74 | 2.49 |
| Image height | 6.44 | 7.40 | 7.40 |
| Total lens length | 144.32 | 144.32 | 144.32 |
| BF | 11.37 | 11.37 | 11.37 |

-continued

Unit mm

| | | | |
|---|---|---|---|
| d8 | 1.03 | 30.59 | 43.25 |
| d14 | 43.57 | 14.02 | 1.35 |
| d15 | 13.28 | 0.91 | 0.79 |
| d24 | 2.11 | 10.84 | 6.13 |
| d27 | 6.79 | 10.42 | 15.25 |
| d32 | 7.00 | 7.00 | 7.00 |

Zoom lens unit data

| Unit | First surface | Focal length |
|---|---|---|
| 1 | 1 | 62.18 |
| 2 | 9 | −11.76 |
| 3 | 16 | 22.57 |
| 4 | 25 | −17.38 |
| 5 | 28 | 28.05 |

Numerical Embodiment 3

Unit mm

Spherical data

| Surface number i | ri | di | ndi | vdi |
|---|---|---|---|---|
| 1 | 129.873 | 1.62 | 1.91650 | 31.6 |
| 2 | 40.556 | 7.14 | 1.49700 | 81.5 |
| 3 | −4541.873 | 0.17 | | |
| 4 | 50.167 | 3.92 | 1.49700 | 81.5 |
| 5 | 379.118 | 0.17 | | |
| 6 | 43.475 | 3.67 | 1.76385 | 48.5 |
| 7 | 229.615 | (Variable) | | |
| 8 | 344.738 | 0.80 | 1.83481 | 42.7 |
| 9 | 11.000 | 4.20 | | |
| 10* | −1131.597 | 0.61 | 1.58313 | 59.5 |
| 11* | 27.191 | 3.45 | | |
| 12 | −13.399 | 0.60 | 1.43700 | 95.1 |
| 13 | −90.092 | 0.14 | | |
| 14 | 89.207 | 1.90 | 1.92286 | 18.9 |
| 15 | −61.798 | (Variable) | | |
| 16 (Stop) | ∞ | (Variable) | | |
| 17* | 16.682 | 4.32 | 1.58313 | 59.4 |
| 18* | −65.999 | 3.47 | | |
| 19 | 838.885 | 0.63 | 1.83400 | 37.2 |
| 20 | 19.683 | 0.75 | | |
| 21 | 29.127 | 3.80 | 1.43700 | 95.1 |
| 22 | −23.217 | 0.39 | | |
| 23 | 19.352 | 0.60 | 1.95375 | 32.3 |
| 24 | 13.784 | 3.84 | 1.48749 | 70.2 |
| 25 | −84.151 | (Variable) | | |
| 26 | −296.190 | 1.24 | 1.84666 | 23.9 |
| 27 | −20.957 | 0.82 | 1.78590 | 44.2 |
| 28 | 18.696 | (Variable) | | |
| 29 | 47.411 | 4.05 | 1.48749 | 70.2 |
| 30 | −18.173 | 0.73 | 2.00069 | 25.5 |
| 31 | −42.420 | (Variable) | | |
| 32 | 62.639 | 3.24 | 1.48749 | 70.2 |
| 33 | −28.992 | (Variable) | | |
| 34 | ∞ | 1.80 | 1.51633 | 64.1 |
| 35 | ∞ | 6.99 | | |
| Image plane | ∞ | | | |

Aspherical data

Tenth surface

K = 1.94946e+004  A4 = −1.32896e−005  A6 = −6.43513e−007
A8 = 6.18406e−010

Eleventh surface

K = 8.95614e−001  A4 = −5.29842e−005  A6 = −8.12556e−007
A8 = 1.95377e−009

Seventeenth surface

K = −1.04648e+000  A4 = 8.71995e−006  A6 = 3.45366e−008
A8 = 1.02665e−010

Eighteenth surface

K = −4.40946e+001  A4 = 9.89401e−006  A6 = 5.73134e−008
A8 = −2.15226e−010

Various data
Zoom ratio 12.00

| | Wide angle | Intermediate | Telephoto |
|---|---|---|---|
| Focal length | 8.30 | 44.51 | 99.60 |
| F number | 2.50 | 3.27 | 3.60 |
| Half angle of view | 37.84 | 9.45 | 4.25 |
| Image height | 6.45 | 7.41 | 7.41 |
| Total lens length | 126.70 | 126.70 | 126.70 |
| BF | 14.77 | 14.77 | 14.77 |
| d7 | 0.62 | 21.11 | 29.89 |
| d15 | 30.65 | 10.16 | 1.38 |
| d16 | 12.42 | 1.34 | 2.52 |
| d25 | 1.58 | 11.49 | 11.18 |
| d28 | 9.90 | 8.93 | 10.19 |
| d31 | 0.48 | 2.62 | 0.49 |
| d33 | 6.59 | 6.59 | 6.59 |

Zoom lens unit data

| Unit | First surface | Focal length |
|---|---|---|
| 1 | 1 | 50.34 |
| 2 | 8 | −9.76 |
| 3 | 17 | 20.11 |
| 4 | 26 | −23.77 |
| 5 | 29 | 169.15 |
| 6 | 32 | 41.13 |

Numerical Embodiment 4

Unit mm

Spherical data

| Surface number i | ri | di | ndi | vdi |
|---|---|---|---|---|
| 1 | 116.966 | 1.50 | 1.91650 | 31.6 |
| 2 | 48.440 | 6.88 | 1.59522 | 67.7 |
| 3 | −349.456 | 0.16 | | |
| 4 | 46.108 | 4.78 | 1.59522 | 67.7 |
| 5 | 330.108 | (Variable) | | |
| 6 | 41.904 | 1.00 | 1.85135 | 40.1 |
| 7* | 15.010 | 4.91 | | |

-continued

Unit mm

| | | | | |
|---|---|---|---|---|
| 8 | −27.537 | 0.75 | 1.59522 | 67.7 |
| 9 | 19.154 | 2.80 | 1.95906 | 17.5 |
| 10 | 53.022 | 2.60 | | |
| 11 | −18.512 | 0.70 | 1.69680 | 55.5 |
| 12 | −36.450 | (Variable) | | |
| 13 (Stop) | ∞ | (Variable) | | |
| 14* | 16.949 | 4.64 | 1.59349 | 67.0 |
| 15 | −118.473 | 3.51 | | |
| 16 | 75.509 | 1.00 | 1.73800 | 32.3 |
| 17 | 16.049 | 1.01 | | |
| 18* | 18.064 | 3.04 | 1.59349 | 67.0 |
| 19 | −79.933 | 0.31 | | |
| 20 | 34.055 | 2.96 | 1.49700 | 81.5 |
| 21 | −16.710 | 0.94 | 1.65412 | 39.7 |
| 22 | −36.147 | (Variable) | | |
| 23* | −403.662 | 2.20 | 1.95906 | 17.5 |
| 24 | −30.092 | 0.70 | 1.88300 | 40.8 |
| 25 | 14.513 | (Variable) | | |
| 26 | −74.834 | 2.20 | 1.43875 | 94.9 |
| 27* | −52.445 | 0.19 | | |
| 28 | 16.043 | 6.09 | 1.43875 | 94.9 |
| 29 | −42.115 | 0.74 | 1.89286 | 20.4 |
| 30 | −56.899 | (Variable) | | |
| 31 | ∞ | 2.35 | 1.51633 | 64.1 |
| 32 | ∞ | 3.43 | | |
| Image plane | ∞ | | | |

Aspherical data

Seventh surface

K = 2.46057e−001   A4 = −4.69144e−006   A6 = −4.51637e−008
A8 = 6.16198e−010

Fourteenth surface

K = −3.56247e−001   A4 = −8.83698e−006   A6 = −5.57216e−008
A8 = 1.08274e−010

Eighteenth surface

K = 7.36590e−001   A4 = −5.33833e−005   A6 = −7.60453e−009
A8 = −3.80882e−010

Twenty-third surface

K = −5.18031e+002   A4 = 1.09452e−005   A6 = −7.23986e−008
A8 = 5.22786e−010

Twenty-seventh surface

K = 1.38843e+001   A4 = 2.42121e−005   A6 = −7.83006e−008
A8 = 7.86833e−010

Various data
Zoom ratio 12.00

| | Wide angle | Intermediate | Telephoto |
|---|---|---|---|
| Focal length | 10.00 | 73.07 | 120.00 |
| F number | 2.80 | 4.36 | 4.50 |
| Half angle of view | 32.17 | 5.78 | 3.53 |
| Image height | 6.29 | 7.40 | 7.40 |
| Total lens length | 134.79 | 134.79 | 134.79 |
| BF | 9.98 | 9.98 | 9.98 |
| d5 | 0.86 | 33.68 | 39.70 |
| d12 | 40.38 | 7.56 | 1.54 |
| d13 | 10.39 | 2.10 | 1.88 |
| d22 | 1.35 | 10.36 | 12.18 |
| d25 | 16.22 | 15.49 | 13.89 |
| d30 | 5.00 | 5.00 | 5.00 |

Zoom lens unit data

| Unit | First surface | Focal length |
|---|---|---|
| 1 | 1 | 71.50 |
| 2 | 6 | −11.63 |
| 3 | 14 | 18.13 |
| 4 | 23 | −16.44 |
| 5 | 26 | 29.11 |

TABLE 1

| Conditional expression | Embodiment | | | |
|---|---|---|---|---|
| | 1 | 2 | 3 | 4 |
| (1) | −0.94 | −1.30 | −0.85 | −1.10 |
| (2) | 6.43 | 7.32 | 6.07 | 7.15 |
| (3) | 1.92 | 1.49 | 2.32 | 2.40 |
| (4) | −0.42 | −0.28 | −0.47 | −0.23 |
| (5) | −5.34 | −5.29 | −5.16 | −6.15 |
| (6) | −2.39 | −3.38 | −2.96 | −4.57 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-156314, filed Aug. 9, 2016, which is hereby incorporated by reference herein in its entirety.

What is claimed is:

1. A zoom lens, comprising, in order from an object side to an image side:

a first lens unit having a positive refractive power;
a second lens unit having a negative refractive power;
a third lens unit having a positive refractive power;
a fourth lens unit having a negative refractive power; and
a fifth lens unit having a positive refractive power,
  wherein intervals between adjacent lens units are changed during zooming,
wherein the first lens unit which is not moved in an optical axis direction for zooming,
wherein the second lens unit, the third lens unit, and the fourth lens unit are moved in the optical axis direction during zooming,
wherein the fourth lens unit is moved in the optical axis direction during focusing,
wherein the third lens unit comprises, in order from the object side to the image side, a first lens subunit having a positive refractive power, and a second lens subunit having a positive refractive power,
wherein the second lens subunit is moved during image stabilization in a direction having a component in a direction orthogonal to the optical axis, and
wherein the following conditional expressions are satisfied:

$-1.35 < f3/f4 < -0.75;$ $5.70 < f1/fw < 7.50;$ and $-5.00 < M2/M3 < -2.00,$ where f1 represents a focal length of the first lens unit, f3 represents a focal length of the third lens unit, f4 represents a focal length of the fourth lens unit, fw represents a focal length of the zoom lens at a wide angle end, M2 represents an amount of movement of the second lens unit during zooming from the wide angle end to a telephoto end, M3 represents an amount of movement of the third lens unit during zooming from the wide angle end to the telephoto end, and a sign of an amount of movement of a lens unit is defined as positive when the lens unit is located closer to the image side at the telephoto end than at the wide angle end.

2. The zoom lens according to claim 1, wherein the following conditional expression is satisfied:

$1.20 < f32/f3 < 2.60$, where f32 represents a focal length of the second lens subunit.

3. The zoom lens according to claim 1, wherein the following conditional expression is satisfied:

$-0.50 < f4/f1 < -0.20$.

4. The zoom lens according to claim 1, wherein the second lens subunit comprises one positive lens and one negative lens.

5. The zoom lens according to claim 1, wherein the fourth lens unit comprises one positive lens and one negative lens.

6. The zoom lens according to claim 1, wherein the third lens unit comprises at least five lenses.

7. The zoom lens according to claim 1, wherein the following conditional expression is satisfied:

$-6.40 < f1/f2 < -4.80$, where f2 represents a focal length of the second lens unit.

8. An image pickup apparatus, comprising:
a zoom lens, comprising, in order from an object side to an image side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein intervals between adjacent lens units are changed during zooming,
wherein the first lens unit is not moved in an optical axis direction for zooming,
wherein the second lens unit, the third lens unit, and the fourth lens unit are moved in the optical axis direction during zooming,
wherein the fourth lens unit is moved in the optical axis direction during focusing,
wherein the third lens unit comprises, in order from the object side to the image side, a first lens subunit having a positive refractive power,
wherein a second lens subunit having a positive refractive power, and the second lens subunit is moved during image stabilization in a direction having a component in a direction orthogonal to the optical axis, and
wherein the following conditional expressions are satisfied:

$-1.35 < f3/f4 < -0.75$;

$5.70 < f1/fw < 7.50$; and $-5.00 < M2/M3 < -2.00$, where f1 represents a focal length of the first lens unit, f3 represents a focal length of the third lens unit, f4 represents a focal length of the fourth lens unit, fw represents a focal length of the zoom lens at a wide angle end; and an image pickup element which receives light of an image formed by the zoom lens, M2 represents an amount of movement of the second lens unit during zooming from the wide angle end to a telephoto end, M3 represents an amount of movement of the third lens unit during zooming from the wide angle end to the telephoto end, and a sign of an amount of movement of a lens unit is defined as positive when the lens unit is located closer to the image side at the telephoto end than at the wide angle end.

* * * * *